(12) United States Patent
Kimura et al.

(10) Patent No.: US 9,736,784 B2
(45) Date of Patent: Aug. 15, 2017

(54) COMMUNICATION CONTROL DEVICE, COMMUNICATION CONTROL METHOD, AND COMMUNICATION CONTROL SYSTEM

(75) Inventors: Ryota Kimura, Tokyo (JP); Ryo Sawai, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/343,455

(22) PCT Filed: Jul. 13, 2012

(86) PCT No.: PCT/JP2012/067912
§ 371 (c)(1),
(2), (4) Date: Mar. 7, 2014

(87) PCT Pub. No.: WO2013/038793
PCT Pub. Date: Mar. 21, 2013

(65) Prior Publication Data
US 2014/0219235 A1  Aug. 7, 2014

(30) Foreign Application Priority Data

Sep. 16, 2011  (JP) ................................ 2011-202913
Nov. 18, 2011  (JP) ................................ 2011-252428

(51) Int. Cl.
*H04W 52/04* (2009.01)
*H04W 16/14* (2009.01)
(Continued)

(52) U.S. Cl.
CPC .......... *H04W 52/04* (2013.01); *H04W 16/14* (2013.01); *H04W 52/16* (2013.01);
(Continued)

(58) Field of Classification Search
None
See application file for complete search history.

(56) References Cited

U.S. PATENT DOCUMENTS 8,086,258 B2  12/2011  Fujii et al.
8,249,631 B2   8/2012  Sawai
(Continued)

FOREIGN PATENT DOCUMENTS

JP  2009-100452 A  5/2009
JP  2011-050032 A  3/2011

OTHER PUBLICATIONS

Extended European Search Report for EP Application No. 12832295.5, dated Mar. 12, 2015.
(Continued)

*Primary Examiner* — Kouroush Mohebbi
(74) *Attorney, Agent, or Firm* — Lerner, David, Littenberg, Krumholz & Mentlik, LLP

(57) ABSTRACT

There is provided a communication control device including a power distribution unit configured to distribute, to one or more secondary systems, a transmission power accepted for a secondary usage of a frequency channel which is protected for a primary system, and a notification unit configured to notify each secondary system of a value of a second transmission power which is decided depending on a value of a first transmission power distributed by the power distribution unit. Upon updating the transmission power, only in a case where a value of the second transmission power which is previously notified and a value of the first transmission power which is newly distributed by the power distribution unit satisfy a predetermined condition with respect to a certain secondary system, the notification unit notifies the secondary system of a new value of the second transmission power.

15 Claims, 17 Drawing Sheets

(51) Int. Cl.
*H04W 52/16* (2009.01)
*H04W 52/24* (2009.01)
H04W 52/22 (2009.01)
H04W 52/36 (2009.01)
H04W 52/38 (2009.01)

(52) U.S. Cl.
CPC ........ *H04W 52/243* (2013.01); *H04W 52/228* (2013.01); *H04W 52/362* (2013.01); *H04W 52/386* (2013.01)

(56) References Cited

U.S. PATENT DOCUMENTS

| | | | |
|---|---|---|---|
| 2009/0298522 A1 | 12/2009 | Chaudhri et al. | |
| 2010/0048234 A1* | 2/2010 | Singh | 455/509 |
| 2010/0330919 A1 | 12/2010 | Gurney et al. | |

OTHER PUBLICATIONS

J. Wang, et al., IEEE, First Cognitive Radio Networking Standard for Personal/Portable Devices in TV White Spaces, 2010.

"Second Report and Order and Memorandum Opinion and Order," [online], [searched on Sep. 6, 2011], Internet<URL:http://hraunfoss.fcc.gov/edocs_public/attachmatch/FCC-08-260A1.pdf>.

"Standard ECMA-392 MAC and PHY for Operation in TV White Space," [online], [searched on Sep. 6, 2010], Internet<URL:http://www.ecma-international.org/publications/standards/Ecma-392.htm>.

Japanese Office Action for JP Application No. 2011252428, dated Feb. 9, 2016.

Chinese Office Action for Application No. 201280043739.X dated Feb. 3, 2017.

* cited by examiner

FIG.1
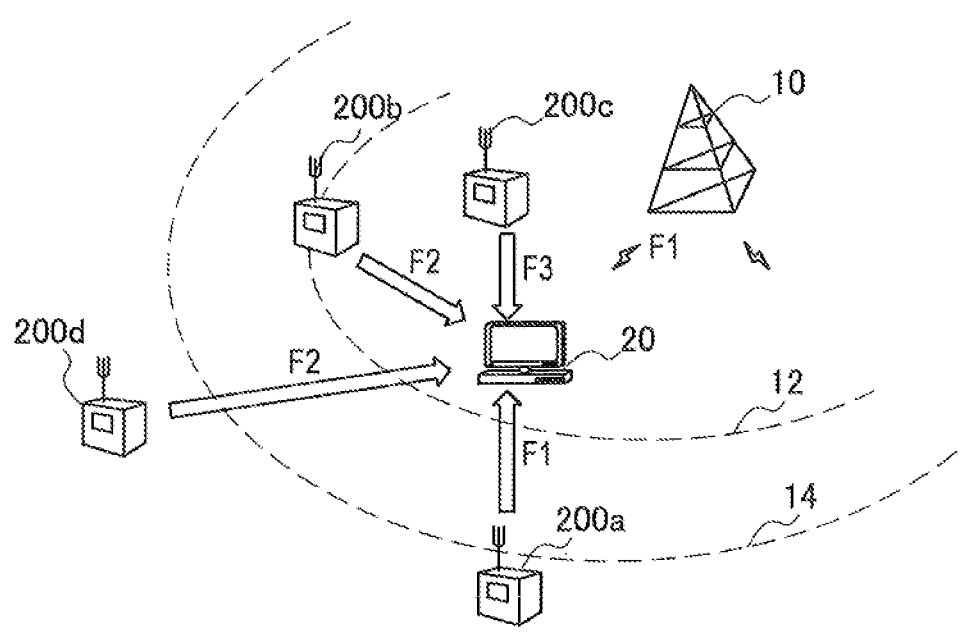
 : Primary Tx  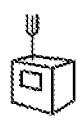 : Secondary Tx
 : Primary Rx  ⇐⇒ : Secondary Signal

FIG. 7

| CHANNEL NUMBER | SYSTEM ID | ACCEPTABLE TRANSMISSION POWER | MARGIN AMOUNT | ALLOCABLE TRANSMISSION POWER | UPDATE DATE |
|---|---|---|---|---|---|
| #1 | K01 | 10 dBm | 2 dBm | 8 dBm | YYYYMMDD hhmmss |
| | K02 | 7 dBm | 2 dBm | 5 dBm | YYYYMMDD hhmmss |
| | K03 | 12 dBm | 2 dBm | 10 dBm | YYYYMMDD hhmmss |
| | ·· | ·· | ·· | ·· | ·· |
| #2 | K01 | 15 dBm | 3 dBm | 12 dBm | YYYYMMDD hhmmss |
| | ·· | ·· | ·· | ·· | ·· |
| ·· | | | | | |

SECONDARY SYSTEM MANAGEMENT TABLE

122

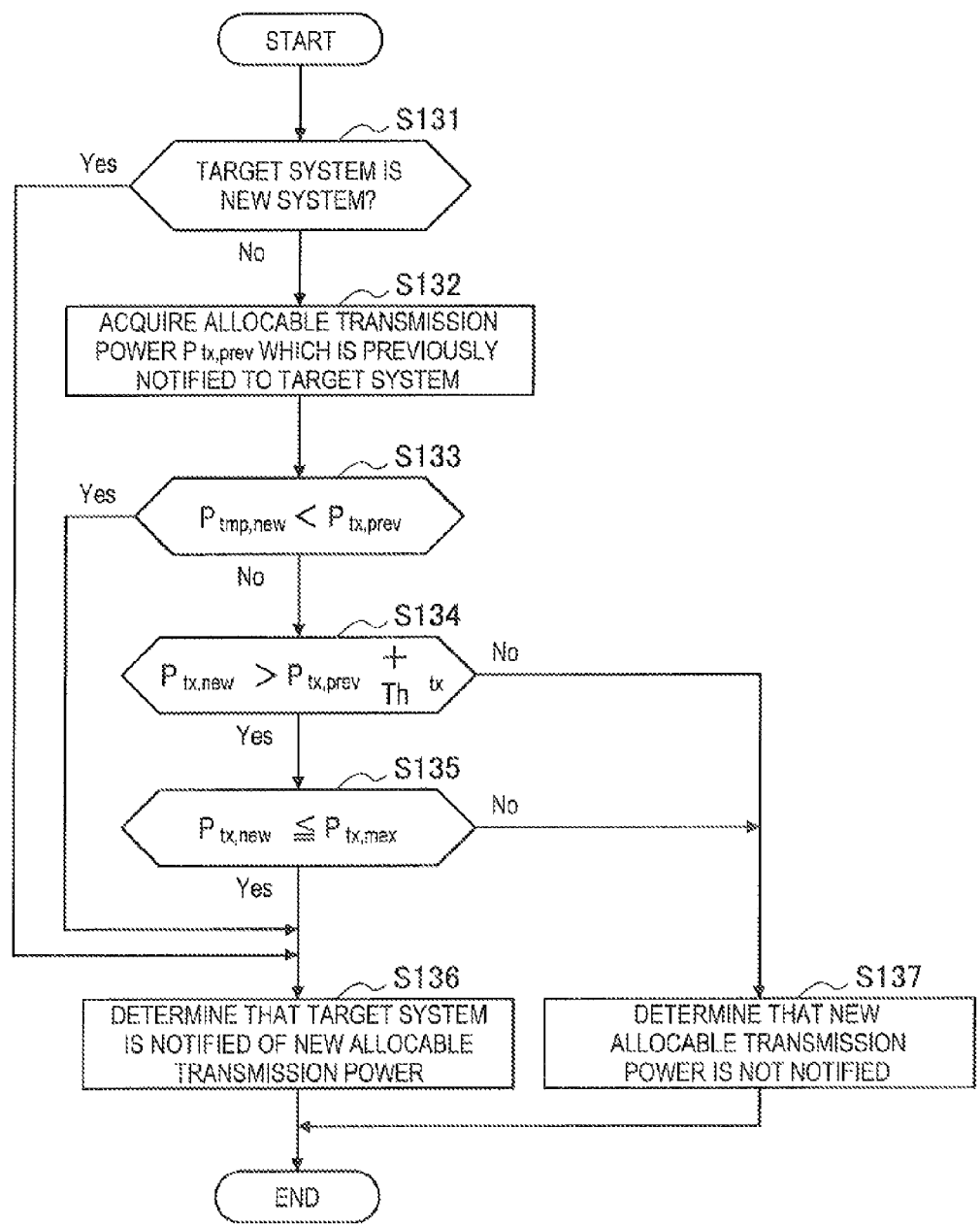

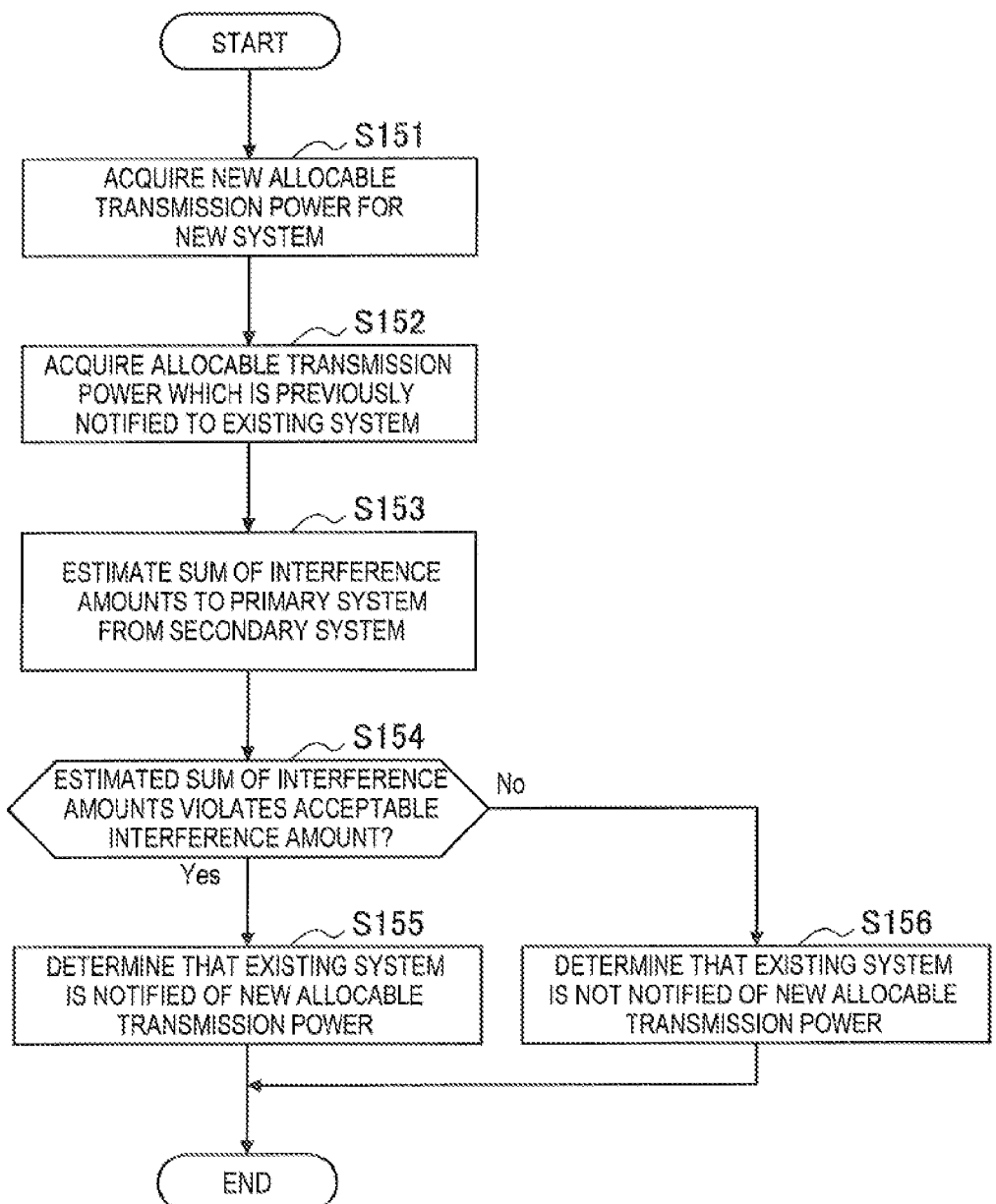

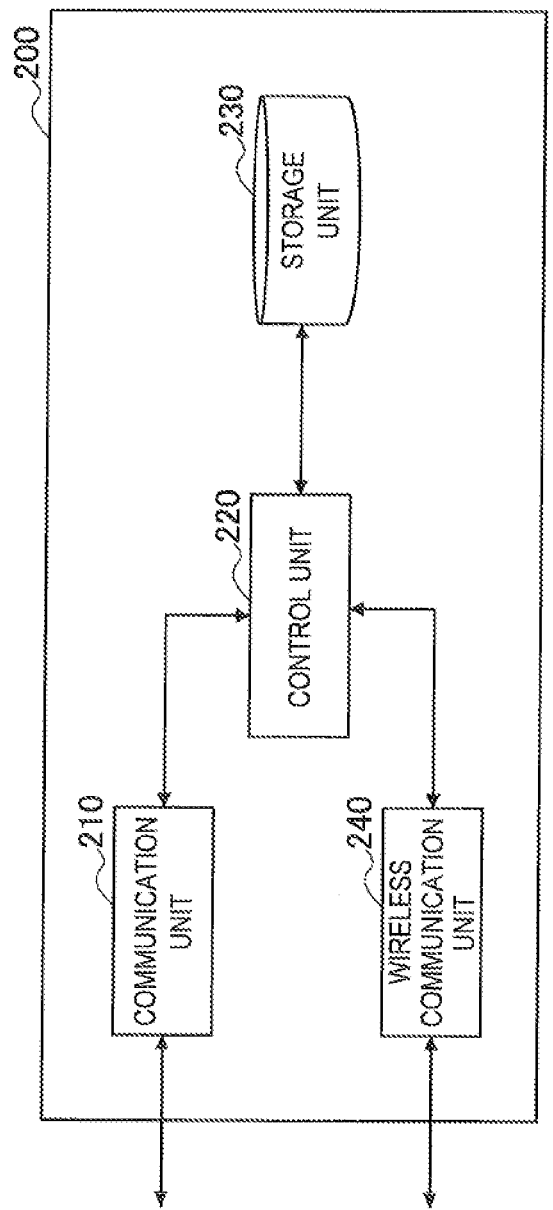

COMMUNICATION CONTROL DEVICE, COMMUNICATION CONTROL METHOD, AND COMMUNICATION CONTROL SYSTEM

The present application is a national phase entry under 35 U.S.C. §371 of International Application No. PCT/JP2012/067912 filed Jul. 13, 2012, published on Mar. 21, 2013 as WO 2013/038793 A1, which claims priority from Japanese Patent Application Nos. JP 2011-202913 filed in the Japanese Patent Office on Sep. 16, 2011, and JP 2011-252428 filed in the Japanese Patent Office on Nov. 18, 2011.

TECHNICAL FIELD

The present disclosure relates to a communication control device, a communication control method, and a communication control system Technical Field.

BACKGROUND ART

Secondary usage of a frequency is discussed as a measure for alleviating future depletion of frequency resources. The secondary usage of a frequency means that part of or all the frequency channels preferentially allocated for a system is secondarily used by the other system. Typically, a system which is preferentially allocated with a frequency channel is called a primary system and a system which secondarily uses the frequency channel is called a secondary system.

A TV white space is an exemplary frequency channel whose secondary usage is discussed (see Non-Patent Literatures 1). The TV white space is a channel which is not used by a TV broadcast system depending on an area among frequency channels allocated for the TV broadcast system as a primary system. The TV white space is opened to a secondary system so that efficient utilization of the frequency resource is to be achieved. A standard for a physical layer (PHY) and a MAC layer for enabling the secondary usage of the TV white space can include IEEE802.22, IEEE802.11af and ECMA (European Computer Manufacturer Association)-392 (CogNea, see Non-Patent Literature 2 described later).

The secondary system is generally required to operate so as not to give a fatal interference to the primary system upon secondary usage of a frequency band. An important technique therefor is transmission power control. For example, Patent Literature 1 described later proposes therein a method in which a base station of a secondary system calculates a path loss therefrom to a reception device of a primary system and a discrete frequency width between frequency channels, and determines maximum transmission power for the secondary system based on the calculation result.

CITATION LIST

Non-Patent Literature

Non-Patent Literature 1: "SECOND REPORT AND ORDER AND MEMORANDUM OPINION AND ORDER," [online], [searched on Sep. 6, 2011], Internet<URL:http://hraunfoss.fcc.gov/edocs_public/attach-match/FCC-08-260A1.pdf>

Non-Patent Literature 2: "Standard ECMA-392 MAC and PHY for Operation in TV White Space," [online], [searched on Sep. 6, 2010], Internet<URL:http://www.ecma-international.org/publications/standards/Ecma-392.htm>

Patent Literature

Patent Literature 1: JP 2009-100452A

SUMMARY OF INVENTION

Technical Problem

Under the circumstances in which a plurality of secondary systems exist, transmission power for each secondary system is preferably to be controlled such that accumulative interferences from the plurality of secondary systems fall within a range acceptable to the primary system. On this occasion, if the transmission power is simply distributed to the plurality of secondary systems depending on the path loss of each secondary system, every time the number of the secondary systems increases or decreases, or the secondary system moves, a transmission power value is to be updated for the plurality of secondary systems. However, such a frequent update of the transmission power value may lead to decrease in system throughput due to increase in signaling.

Therefore, it is beneficial if a mechanism is achieved which can properly control accumulative interferences from a plurality of secondary systems without excessively increasing the signaling.

Solution to Problem

According to the present disclosure, there is provided a communication control device including a power distribution unit configured to distribute, to one or more secondary systems, a transmission power accepted for a secondary usage of a frequency channel which is protected for a primary system, and a notification unit configured to notify each secondary system of a value of a second transmission power which is decided depending on a value of a first transmission power distributed by the power distribution unit. Upon updating the transmission power, only in a case where a value of the second transmission power which is previously notified and a value of the first transmission power which is newly distributed by the power distribution unit satisfy a predetermined condition with respect to a certain secondary system, the notification unit notifies the secondary system of a new value of the second transmission power.

According to the present disclosure, there is provided a communication control method including distributing, to one or more secondary systems, a transmission power accepted for a secondary usage of a frequency channel which is protected for a primary system, and notifying each secondary system of a value of a second transmission power which is decided depending on a value of a first transmission power distributed by the power distribution unit. Upon updating the transmission power, only in a case where a value of the second transmission power which is previously notified and a value of the first transmission power which is newly distributed satisfy a predetermined condition with respect to a certain secondary system, the secondary system is notified of a new value of the second transmission power.

According to the present disclosure, there is provided a communication control system including a communication control device including a power distribution unit configured to distribute, to one or more secondary systems, a transmission power accepted for a secondary usage of a frequency channel which is protected for a primary system, and a notification unit configured to notify each secondary system of a value of a second transmission power which is decided depending on a value of a first transmission power distributed by the power distribution unit, and a communication device setting a transmission power for operating the secondary system within a range of the value of the second transmission power notified from the communication control device. Upon updating the transmission power, only in a case where a value of the second transmission power which is previously notified to the communication device and a value of the first transmission power which is newly distributed to the communication device satisfy a predetermined condition, the notification unit of the communication control device notifies the communication device of the new value of the second transmission power.

Advantageous Effects of Invention

According to a technology of the present disclosure, the accumulative interferences from a plurality of secondary systems can be properly controlled without excessively increasing the signaling.

BRIEF DESCRIPTION OF DRAWINGS

FIG. 1 is an explanatory diagram for explaining an interference a node of a primary system suffers upon secondary usage of a frequency.

FIG. 7 is an explanatory diagram illustrating an exemplary configuration of a secondary system management table according to one embodiment.

FIG. 9B is a flowchart illustrating a second example of detailed flow of the power notification determination processing illustrated in FIG. 8.

FIG. 11 is a flowchart illustrating an example of flow of an additional determination processing.

FIG. 13 is a block diagram illustrating of an exemplary configuration of a master node of the secondary system according to one embodiment.

DESCRIPTION OF EMBODIMENTS

Figure 2:
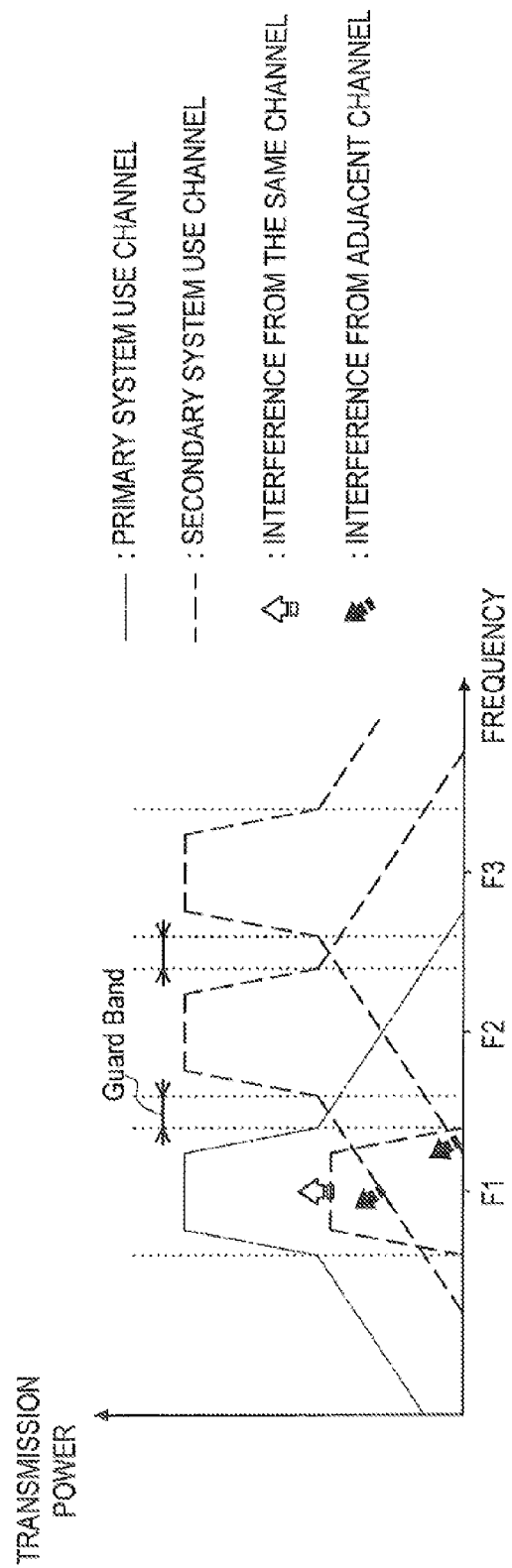
FIG. 2 is an explanatory diagram for explaining an interference in a channel and an interference between channels.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

A description will be given in the following order.
1. Outline of system
1-1. Problem relating to one embodiment
1-2. Outline of communication control system
2. Basic interference control model
3. Exemplary configuration of secondary system manager
3-1. Explanation of units
3-2. Flow of process
3-3. Distance between primary system and secondary system
3-4. Simplification of term of interference between channels
4. Exemplary configuration of master node
5. Explanatory modification
6. Conclusion <1. Outline of System>

First, with reference to FIG. 1 to FIG. 4, a description will be given of a problem relating to one embodiment and an outline of a communication control system.

[1-1. Problem Relating to One Embodiment]

FIG. 1 is an explanatory diagram for explaining an interference a node of a primary system suffers upon secondary usage of a frequency. With reference to FIG. 1, there are illustrated a primary transmission station 10 for providing services of the primary system, and a primary reception station 20 located inside a boundary 12 of a service area for the primary system. The primary transmission station 10 may be a TV broadcast station, or a wireless base station or repeater station in a cellular communication system, for example. The cellular communication system may include the GSM, UMTS, WCDMA, CDMA2000, LTE, LTE-Advanced, IEEE802.16, WiMAX or WiMAX2, and the like. When the primary transmission station 10 is a TV broadcast station, the primary reception station 20 is a receiver having an antenna or tuner for receiving TV broadcast. When the primary transmission station 10 is a wireless base station in a cellular communication system, the primary reception station 20 is a wireless terminal operating in accordance with the cellular communication system. In the example of FIG. 1, a channel F1 is allocated for the primary transmission station 10. The primary transmission station 10 can provide TV broadcast services, wireless communication services or some other wireless services by transmitting wireless signals on the channel F1.

FIG. 1 further shows master nodes 200a, 200b, 200c, and 200d each operating the secondary system. Each of master nodes uses the channel F1 allocated for the primary system or an adjacent channel F2 or F3 to operate the secondary system respectively. Each master node may be a wireless access point which is compliant with or partially uses a wireless communication system such as IEEE802.22, IEEE802.11, or ECMA, or may be a wireless base station or repeater station which is compliant with the cellular communication system or partially uses standards thereof. If the secondary system is operated in accordance with the cellular communication system, the cellular communication system may be the same as or different from a system of the primary system. One or more slave nodes (not shown) for the secondary system may exist around each master node. Slave nodes support the same wireless communication system as the master node which they are connected to. In the example of FIG. 1, a master node 200a located outside a boundary 14 a guard area uses the channel F1. Master nodes 200b and 200c located inside the guard area use the channels F2 and F3 adjacent to the channel F1. A master node 200d located outside the boundary 14 the guard area uses the channel F2.

Under the circumstances such as of FIG. 1, the primary reception station 20 may be influenced by an interference due to the wireless signals transmitted from secondary transmission stations (both master node and slave node). FIG. 2 is an explanatory diagram for explaining an interference in channel (in-band) and an interference between channels. In the example of FIG. 2, the channel F1 is a channel used by the primary system. If the master node 200a in FIG. 1 secondarily uses this channel F1, an interference may occur in the same channel. The channel F2 is a channel adjacent to the channel F1. The channel F3 is a channel adjacent to the channel F2. A guard band is provided between the channel F1 and the channel F2, and between the channel F2 and the channel F3. When these channels F2 and F3 are used by other system, the primary system is ideally to suffer no interference. However, as illustrated in FIG. 2, actually a considerable interference may occur from an adjacent channel (such as channels F2, F3 and other channels) due to out-band radiation.

In order that the accumulative interferences from a plurality of secondary systems give no negative influence to the primary system, it is preferable that a transmission power for each secondary system is dynamically controlled depending on increase and decrease in the number of the secondary systems or move of the secondary system. For example, if the master node 200b newly appears in a situation where the master nodes 200a, 200c, and 200d shown in FIG. 1 are each operating the secondary system, the transmission powers allocated for the master nodes 200a, 200c, and 200d are updated to lower values to allow the master node 200b to be newly allocated with a transmission power. However, if the transmission power value is updated for a plurality of secondary systems in every event such as increase and decrease in the number of the secondary system or move of the secondary system, a message for notifying the transmission power value is to be frequently exchanges in the system, leading to increase in signaling. Then, excessive increase in the signaling may lead to decrease in system throughput. Therefore, a detailed explanation will be given in this description of an embodiment for properly controlling the accumulative interferences from a plurality of secondary systems to the primary system without the signaling being excessively increased.

[1-2. Outline of Communication Control System]

Figure 3:
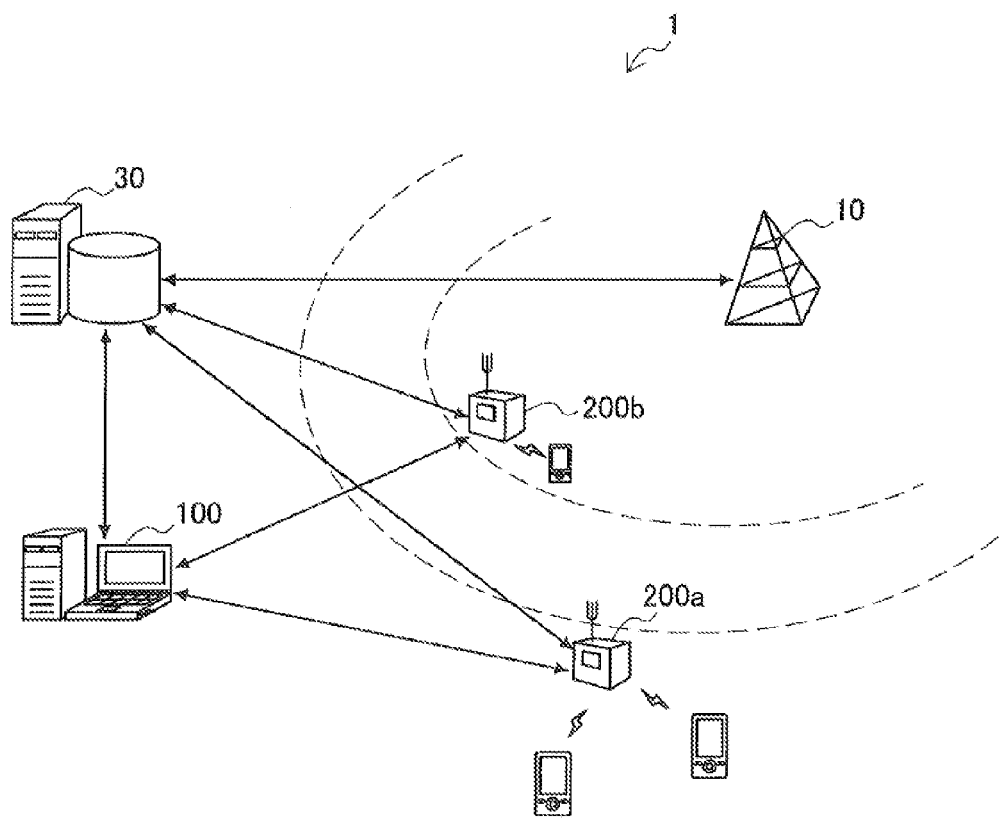
FIG. 3 is an explanatory diagram for explaining a configuration of a communication control system according to one embodiment.

FIG. 3 is an explanatory diagram for explaining a communication control system 1 according to one embodiment. With reference to FIG. 3, the communication control system 1 includes a primary transmission station 10, data server 30, communication control device 100, and master nodes 200a and 200b. Here, in the example of FIG. 3, only the master nodes 200a and 200b are illustrated as a master node operating the secondary system, but actually more master nodes may exist. Unless otherwise the master nodes 200a and 200b (and other master nodes) need to be distinguished from each other in the explanation of this description below, an alphabetical character suffixed to a symbol is omitted to collectively refer to these as the master node 200.

The data server 30 is a server device having a database storing therein data about the secondary usage. The data server 30 accepts an access from the master node 200 to provide data indicating secondarily usable channels and position data of the transmission station 10 of the primary system to the master node 200. Additionally, the master node 200 registers information on the secondary system in the data server 30 at the start of the secondary usage. Communication between the data server 30 and the master node 200 may be made via an arbitrary network such as the Internet. Refer to Non-Patent Literature 1 describing the secondary usage of the TV white space as to an exemplary specification of the data server like this.

The communication control device 100 has a function as a secondary system manager which adjusts the transmission power used by each master node 200 such that the accumulative interferences from a plurality of secondary systems give no negative influence to primary system. The communication control device 100 can access to the data server 30 via a network such as the Internet, for example, and acquires data used for adjusting the transmission power from the data server 30. In addition, the communication control device 100 is communicably connected with also each master node 200. Then the communication control device 100, in response to a request from the master node 200 or primary system, or periodically, adjusts the transmission power for a plurality of secondary systems. Note that, without limited to the example of FIG. 3, the communication control device 100 may be mounted on the physically same device as the data server 30 or any of the master nodes 200.

Figure 4:
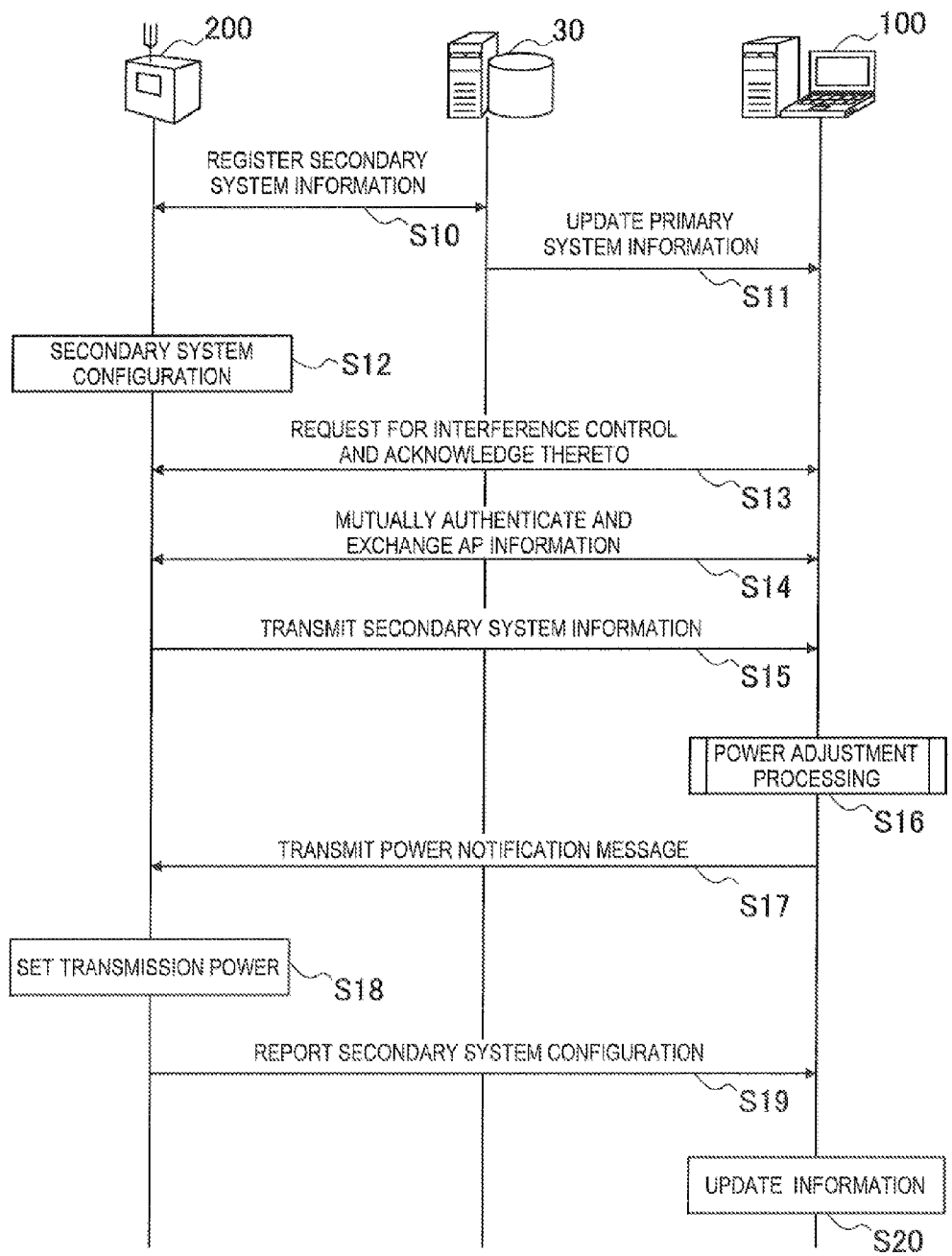
FIG. 4 is a sequence diagram illustrating an exemplary schematic flow of an interference control processing performed in the communication control system according to one embodiment.

FIG. 4 is a sequence diagram illustrating an exemplary schematic flow of an interference control processing performed in the communication control system 1.

First, the master node 200, before starting to operate the secondary system, registers information on the secondary system in the data server 30 (step S10). The information registered here may include, for example, a device ID, class and position data of the master node 200 and the like. Moreover, in response to registration of the information on the secondary system, the data server 30 notifies the master node 200 of information for configuring the secondary system such as a list of channel numbers of secondarily usable frequency channels, acceptable maximum transmission power, and spectrum mask. Here, an access cycle from the master node 200 to the data server 30 may be decided on the basis of provisions of law regarding frequency usage regulation. For example, the FCC (Federal Communications Commission) is considering a requirement that if the position of the master node varies, the position data should be updated at least every 60 seconds. In addition, it has been recommended that the list of the usable channel numbers should be checked by the master node at least every 30 seconds. However, increase in the access to the data server 30 leads to increase in overhead. Therefore, the access cycle to the data server 30 may be set to a longer cycle (e.g., integral multiple of the regulated cycle and so on). Moreover, the access cycle may be dynamically set depending on the number of active nodes (e.g., if the number of nodes is small, a risk of interference is low so that the cycle may be set longer). The data server 30 may instruct the master node 200 about the access cycle upon an initial registration of the information on the secondary system, for example.

Further, the communication control device 100 receives information on the primary system from the data server 30 periodically, for example, and uses the received information to update information stored in itself (step S11). The information received here may include one or more of the position data of the primary transmission station 10, height of an antenna, width of the guard area, list of the channel numbers of the frequency channels, acceptable interference amount of the primary system, position data of a reference point for interference calculation described later, list of IDs of the registered master nodes 200, and other parameters (e.g., ACLR (adjacent channel leakage ratio), fading margin, shadowing margin, protection ratio, ACS (adjacent channel selection) and the like). Here, the communication control device 100 may indirectly receive all or a part of the information on the primary system (e.g., list of the channel numbers and the like) from the master node 200.

Next, the master node 200 configures the secondary system on the basis of the information notified by the data server 30 (step S12). For example, the master node 200 selects one or more channels from the secondarily usable frequency channels as a use channel for the secondary system. Then, a request for interference control is transmitted from the master node 200 to the communication control device 100 or from the communication control device 100 to the master node 200 (step S13).

When an acknowledge is returned to the request for interference control, mutual authentication and application level information exchange are performed between the communication control device 100 and the master node 200 (step S14). Additionally, the information on the secondary system is transmitted from the master node 200 to the communication control device 100 (step S15). The information transmitted here may include a device ID of the master node 200, class, position data, channel number of the frequency channel (use channel) selected by the master node 200, information on a communication quality requirement (including a QoS (Quality of Service) requirement), priority information, communication history and the like.

Next, the communication control device 100 performs a power adjustment processing on the basis of the information acquired from the data server 30 and the master node 200 (step S16). The power adjustment processing here by the communication control device 100 will be described in detail later. Then, the communication control device 100 transmits a power notification message for notifying a newly allocated transmission power to the master node 200 (step S17). In addition, the communication control device 100 transmits the power notification message also to the master node 200 of the existing secondary system which is determined to be notified of the newly allocated transmission power.

The master node 200, in receiving the power notification message, sets an output level of a transmitting circuit in itself in accordance with a value of the notified transmission power (step S18). Further, the master node 200 may instruct a slave node connected with itself about a value of the transmission power to be used. The master node 200, in completing the setting of the transmission power, reports the secondary system configuration to the communication control device 100 (step S19). Then, the communication control device 100 updates the information on secondary system stored in itself in response to the report from the master node 200 (step S20).

Note that here the explanation is given of the example in which the data server 30 provides the list of the channel numbers of the secondarily usable frequency channels to the master node 200. However, instead of the data server 30, the communication control device 100 may provide the list of the channel numbers of the channels recommended for the secondary usage to the master node 200. For example, a channel not used by the existing secondary system, a channel used by a smaller number of the secondary systems using the relevant channel, or a channel with a larger rest of the acceptable interference amount is recommended for the secondary system. Here, the rest of the acceptable interference amount means an interference amount obtained by subtracting an interference amount owing to the existing secondary system from the acceptable interference amount.

<2. Basic Interference Control Model>

In the above described sequences, the power adjustment processing by the communication control device 100 at step S16 may be a processing on the basis of, for example, an interference control model described below. Note that here a true value expression is used to describe mathematical formulas of the interference control model, but this interference control model is applicable to a decibel value expression by converting the mathematical formula.

First, given that a reference point for the interference calculation is i, the frequency channel allocated for the primary system is $f_j$, the acceptable interference amount of the primary system is $I_{acceptable}(i, f_j)$. Additionally, assuming that a single secondary system k which secondarily uses the channel $f_j$ is located on a periphery of the guard area. Accordingly, a relation expression below holds among a maximum transmission power $P_{max}(f_j, k)$ of the secondary system, a path loss $L(i, f_j, k)$ for a minimum separation distance (width of the guard area), and an acceptable interference amount $I_{acceptable}(i, f_j)$.

$$I_{acceptable}(i,f_j) = P_{max}(f_j,k) \cdot L(i,f_j,k) \quad (1)$$

Here, a position of the reference point is decided on the basis of the information the communication control device 100 receives from the data server 30 at step S11 in FIG. 4. In a case where the reference point is defined in advance, the position data (e.g., longitude and latitude, etc.) representing the position of the relevant reference point may be received from the data server 30. Additionally, the communication control device 100 may use the position data of the node, service area, or guard area of the primary system received from the data server 30, and the position data received from each master node 200 to dynamically decide the position of the reference point.

If a plurality of secondary systems exist, allocation of the transmission power for each secondary system is required to satisfy a relation expression below obtained by extending Formula (1).

$$I_{acceptable}(i, f_j) \geq \sum_{k=1}^{M_j} P(f_j, k) \cdot L(i, f_j, k) \cdot G(f_j, k) + \quad (2)$$

-continued $$\sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}$$

Here, the first term of a right-hand side in Formula (2) represents the sum of interference amounts caused by the secondary systems to which secondarily use a channel the same as the channel $f_j$ allocated for the primary system. $M_j$ is the number of the secondary systems which secondarily use the same channel, $P(f_j, k)$ is a power allocated for the k-th secondary system, $L(i, f_j, k)$ is a path loss between the k-th secondary system and the reference point i of the primary system, and $G(f_j, k)$ is a gain component. Further, the second term represents the sum of interference amounts caused by the secondary systems which secondarily use an adjacent channel different from the channel $f_j$. $O_j$ is the number of adjacent channels, jj is an index of the adjacent channel, $N_{jj}$ is the number of the secondary systems which secondarily use the adjacent channel, kk is an index of the secondary system which secondarily uses the adjacent channel, and $H(f_j, f_{jj}, kk)$ is a loss component with respect to a secondary system kk from the adjacent channel $f_{jj}$ to the channel $f_j$. Note that the above $M_j$ and $N_{jj}$ may be the number of the active secondary systems (or master nodes).

The gain component G in Formula (2) may be decided on the basis of mainly factors shown in Table 1 below.

TABLE 1

Factor of gain component between systems

| Symbol | Factor |
| --- | --- |
| PR $(f_{jj} - f_j)$ | Protection ratio between channels with an interval of frequency $f_{jj} - f_j$ therebetween |
| μ σ | Shadowing margin |
| σ | Shadowing (standard deviation) |
| $D_{dir}$ (i, $f_{j\ (or\ jj)}$) | Signal discrimination degree based on antenna directionality of the primary reception station at the channel $f_j(f_{jj})$ and the reference point i |
| $D_{pol}$ (i, $f_{j\ (or\ jj)}$) | Signal discrimination degree based on polarization of the primary reception station at the channel $f_j(f_{jj})$ and the reference point i |
| $G_{ant}$ (i, $f_{j\ (or\ jj)}$) | Antenna gain of the primary reception station at the channel $f_j(f_{jj})$ and the reference point i |
| $L_f$ (i, $f_{j\ (or\ jj)}$) | Fader loss of the primary reception station at the channel $f_j(f_{jj})$ and the reference point i |

For example, the protection ratio PR in Table 1 may be applied with a concept as below. Specifically, given that an acceptable interference amount from the secondary system which secondarily uses a channel $f_{CR}$ to the primary system using a channel $f_{BS}$ is an $I_{acceptable}$. Further, a reception power required for the primary system is $P_{req}(f_{BS})$. A formula as below holds between these parameters.

$$I_{acceptable} = P_{req}(f_{BS}) / PR(f_{CR} - f_{BS}) \quad (3)$$

Note that when the protection ratio is expressed in decibels, a formula as below may be used in place of above Formula (3).

$$I_{acceptable} = P_{req}(f_{BS}) / 10^{PR(f_{CR} - f_{BS})/10} \quad (4)$$

The loss component H in Formula (2) depends on, for example, adjacent channel selectivity and a leakage ratio. Here, for details of these gain component and loss component, refer to, for example, "Technical and operational requirements for the possible operation of cognitive radio systems in the "white spaces" of the frequency band 470-790 MHz" (ECC Report 159, 2010).

<3. Exemplary Configuration of Secondary System Manager>

Figure 5:
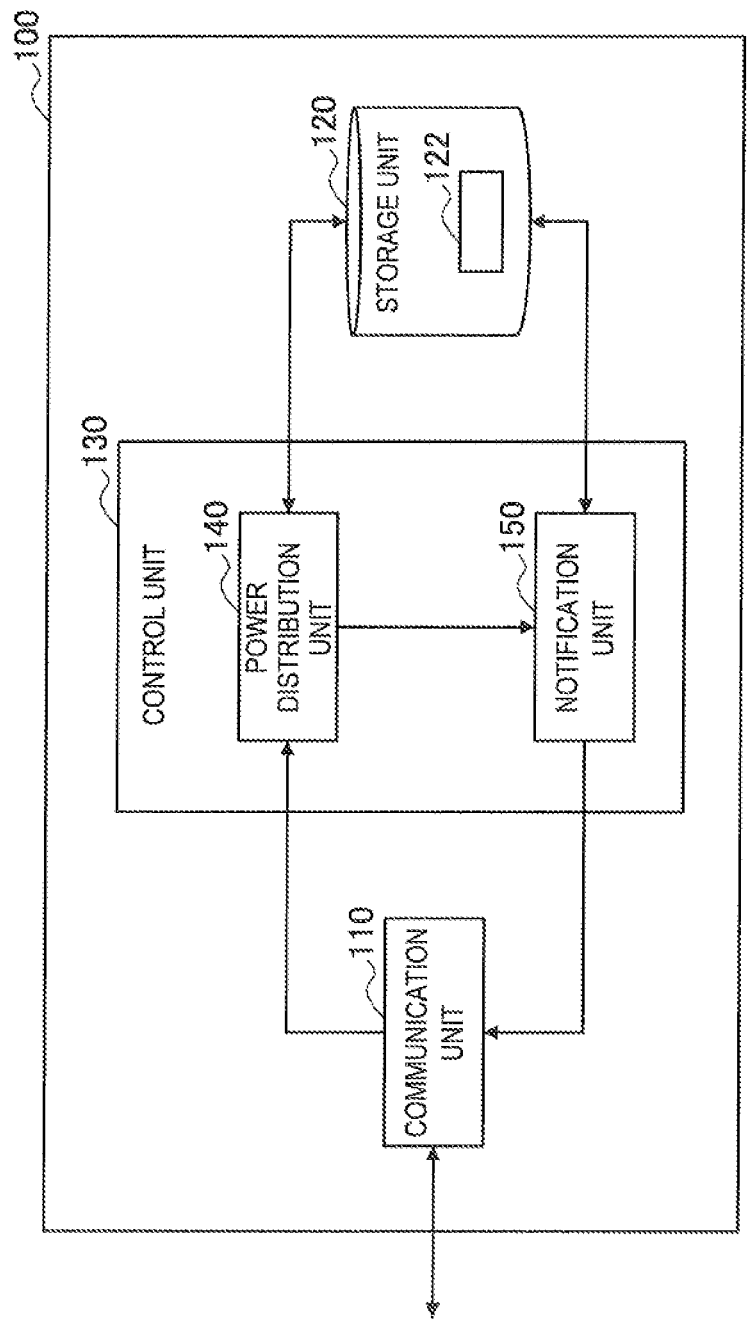
FIG. 5 is a block diagram illustrating an exemplary configuration of the communication control device according to one embodiment.

FIG. 5 is a block diagram illustrating an exemplary configuration of the communication control device 100 (that is, secondary system manager) illustrated in FIG. 3. With reference to FIG. 5, the communication control device 100 includes a communication unit 110, storage unit 120, and control unit 130. The control unit 130 includes a power distribution unit 140 and notification unit 150.

[3-1. Explanation of Units]

(1) Communication Unit

The communication unit 110 is a communication interface for communication of the communication control device 100 with the data server 30 and with the master node 200. Communication between the communication control device 100 and the data server 30, and between the communication control device 100 and the master node 200 may be achieved by any of a wired communication or wireless communication, or a combination thereof.

(2) Storage Unit

The storage unit 120 stores a program and data for operation for the communication control device 100 using a storage medium such as a hard disk or semiconductor memory. For example, the storage unit 120 stores the information on the primary system received from the data server 30 and the information on the secondary system received from the master node 200 of each secondary system. In this embodiment, the storage unit 120 has a secondary system management table 122 which is referred to or updated by the power distribution unit 140 and notification unit 150. An exemplary configuration of the secondary system management table 122 will be specifically described later.

(3) Power Distribution Unit

The power distribution unit 140 distributes to one or more secondary systems the transmission power accepted for the secondary usage of the frequency channel which is protected for the primary system. The frequency channel protected for the primary system may include the frequency channel allocated to the primary system and the adjacent frequency channels thereof. In this description, a first transmission power which is calculated for each secondary system as a result of calculating the power distribution by the power distribution unit 140 is referred to as an acceptable transmission power. On the other hand, the notification unit 150 described later notifies each secondary system of a value of the second transmission power which is decided depending on a value of the acceptable transmission power distributed by the power distribution unit 140 if a predetermined condition is satisfied. In this embodiment, the second transmission power notified to each secondary system in this way is referred to as an allocable transmission power. Hereinafter, three examples of a power distribution processing will be described which may be performed by the power distribution unit 140.

(3-1) First Example

Figure 6A:
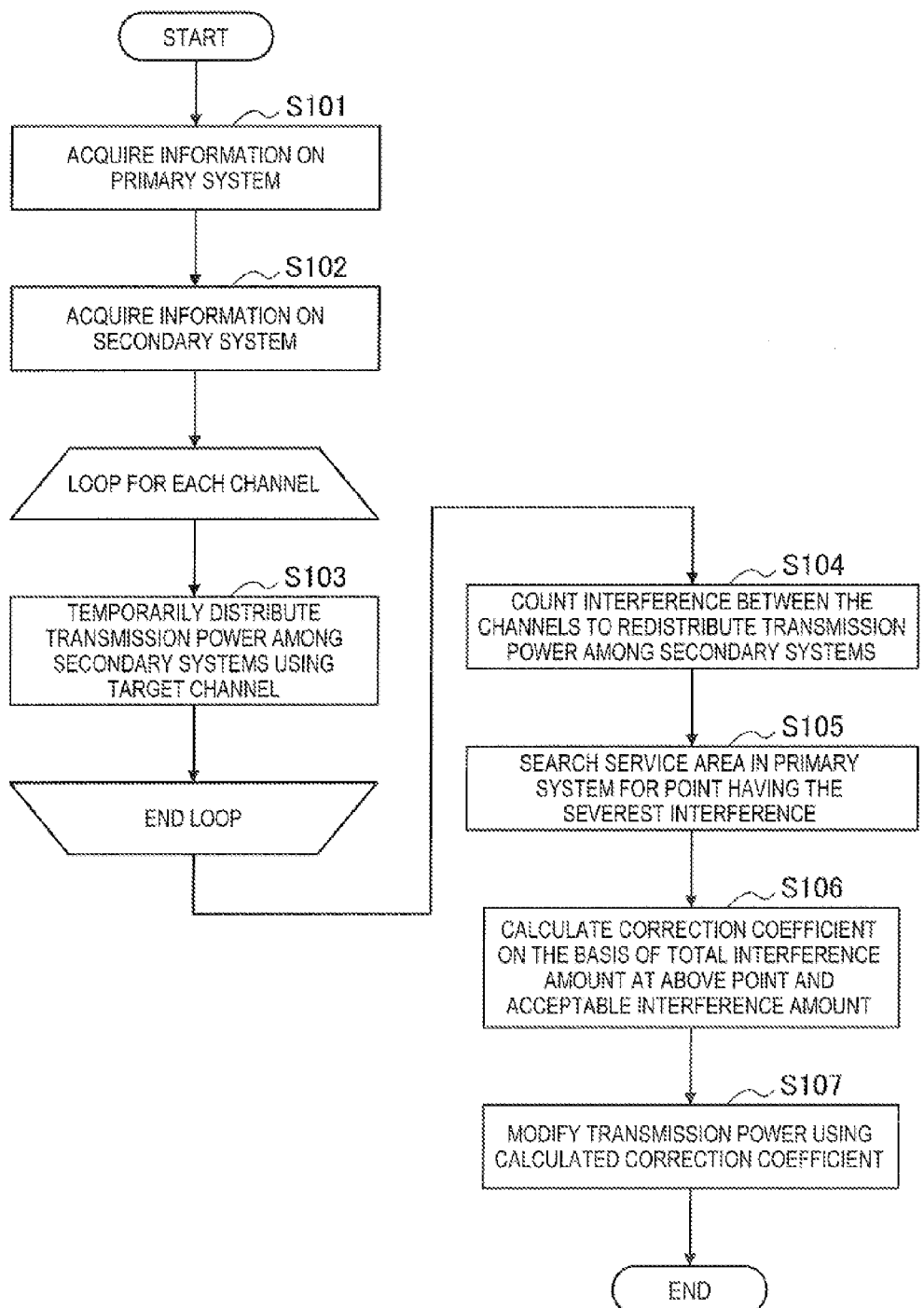
FIG. 6A is a flowchart illustrating a first example of flow of a power distribution processing according to one embodiment.

FIG. 6A is a flowchart illustrating a first example of flow of the power distribution processing by the power distribution unit 140. In the first example, the power distribution unit 140 temporarily allocates for each frequency channel the transmission power to the secondary system which secondarily uses the relevant frequency channel, and thereafter, redistributes the temporarily allocated transmission power with taking into account the influences among different frequency channels. Then, the power distribution unit 140 modifies the transmission power after allocation or redistribution so as to meet Formula (2) in the interference control model described above.

With reference to FIG. 6A, first the power distribution unit 140 acquires from the storage unit 120 the information on the primary system provided from the data server 30 (step S101). In addition, the power distribution unit 140 acquires from the storage unit 120 the information on the secondary system collected from the master node 200 (step S102). Next, the power distribution unit 140 repeats the process of step S103 for each frequency channel used by the secondary system.

At step S103, the power distribution unit 140 temporarily allocates the transmission power among the secondary systems using a certain target channel (step S103). Temporal allocation of the transmission power may be carried out in accordance with, for example, any of three kinds of method, a fixed margin method, even method and uneven method, described below.

(Fixed Margin Method)

A first method is a fixed margin method. In a case of the fixed margin method, a distribution margin MI (and safety margin SM) fixedly set in advance is used to easily calculate the transmission power allocated to each secondary system. In this case, a calculation cost for allocating the transmission power decreases. A transmission power $P(f_j, k)$ which is temporarily allocated to the k-th secondary system to use the frequency channel $f_j$ is derived from a formula below.

$$P(f_j,k)=I_{acceptable}(i,f_j)/L(i,f_j,k)\cdot G(f_j,k)\cdot MI\cdot SM \qquad (5)$$

(Even Method)

A second method is an even method. In a case of the even method, the transmission powers allocated to respective secondary systems are equal to each other. In other words, the transmission power is evenly distributed to a plurality of secondary systems. The transmission power $P(f_j, k)$ which is temporarily allocated to the k-th secondary system to use the frequency channel $f_j$ is derived from a formula below.

$$P(f_j, k) = I_{acceptable}(i, f_j) \bigg/ \sum_{kk=1}^{M_j} \{L(i, f_j, kk)\cdot G(f_j, kk)\} \qquad (6)$$

(Uneven Method)

A third method is an uneven method. In a case of the uneven method, the secondary system has the larger distance to the primary system, the secondary system is allocated with the more transmission power. Accordingly, chances of the secondary usage as a whole may be increased. The transmission power $P(f_j, k)$ temporarily allocated to the k-th secondary system to use the frequency channel $f_j$ is derived from a formula below.

$$P(f_j,k)=I_{acceptable}(i,f_j)/\{L(i,f_j,k)\cdot G(f_j,k)\cdot M_j\} \qquad (7)$$

Moreover, the even method and the uneven method may be combined with an interference-causing margin reduction method described below.

(Interference-Causing Margin Reduction Method)

The interference-causing margin reduction method is a method in which the safety margin SM for reducing an interference risk is counted, and may be used in combination with the even method or uneven method described above. The transmission power $P(f_j, k)$ is derived from Formula (8) below in terms of the combination with the even method, and Formula (9) below in terms of the combination with the uneven method. Here, SM represents a safety margin set in advance or notified from the master node 200.

$$P(f_j, k) = I_{acceptable}(i, f_j) \bigg/ \sum_{kk=1}^{M_j} \{L(i, f_j, kk)\cdot G(f_j, kk)\cdot SM\} \qquad (8)$$

$$P(f_j, k) = I_{acceptable}(i, f_j)/\{L(i, f_j, k)\cdot G(f_j, k)\cdot M_j\cdot SM\} \qquad (9)$$

Further, the methods described above may be combined with a weighted distribution method described below.

(Weighted Distribution Method)

The weighted distribution method is a method in which distribution of the transmission power is weighted depending on a priority for each the secondary system. The transmission power $P(f_j, k)$ is derived from Formula (10) below in terms of the combination with the even method, and Formula (11) below in terms of the combination with the uneven method. In addition, the transmission power $P(f_j, k)$ is derived from Formula (10') below in terms of the combination with the even method and interference-causing margin reduction method, and Formula (11') below in terms of the combination with the uneven method and interference-causing margin reduction method. Here, $w_k$ represents a weighting depending on the priority. Note that a weight $w_j$ for each frequency channel may be used in place of the weight $w_k$ for each secondary system.

$$P(f_j, k) = \qquad (10)$$
$$\left(w_k \bigg/ \sum_{kk=1}^{M_j} w_{kk}\right) I_{acceptable}(i, f_j) \bigg/ \sum_{kk=1}^{M_j} \{L(i, f_j, kk)\cdot G(f_j, kk)\}$$

$$P(f_j, k) = \left(w_k \bigg/ \sum_{kk=1}^{M_j} w_{kk}\right) I_{acceptable}(i, f_j)/\{L(i, f_j, k)\cdot G(f_j, k)\cdot M_j\} \qquad (11)$$

$$P(f_j, k) = \qquad (10')$$
$$\left(w_k \bigg/ \sum_{kk=1}^{M_j} w_{kk}\right) I_{acceptable}(i, f_j) \bigg/ \sum_{kk=1}^{M_j} \{L(i, f_j, kk)\cdot G(f_j, kk)\cdot SM\}$$

$$P(f_j, k) = \qquad (11')$$
$$\left(w_k \bigg/ \sum_{kk=1}^{M_j} w_{kk}\right) I_{acceptable}(i, f_j)/\{L(i, f_j, k)\cdot G(f_j, k)\cdot M_j\cdot SM\}$$

Here, in the primary system there may be some cases where only the acceptable interference amount $I_{acceptable}(i, f_{jj})$ of the frequency channel $f_{jj}$ is defined and the acceptable interference amount of the adjacent frequency channel $f_j$ is not defined. For example, such a case may occur when the frequency channel $f_{jj}$ is a channel allocated to the primary system, and the adjacent channel $f_j$ thereof is a channel not used by the primary system but protected. In that case, a distribution formula for distributing the transmission power to the secondary systems which secondarily use the adjacent channel $f_j$ is derived by, in the distribution formulas described above, replacing the acceptable interference amount $I_{acceptable}(i, f_j)$ with the $I_{acceptable}(i, f_{jj})$ and replacing the term $L(i,f_j, k)\cdot G(f_j, k)$ of the path loss and gain component with a term $L(i,f_j,k)\cdot G(f_j, k)/H(f_{jj}, f_j, k)$ for counting the loss component. As an example, a distribution formula in the fixed margin method may be modified as below.

$$P(f_j,k)=I_{acceptable}(i,f_{jj})\cdot H(f_{jj},f_j,k)/L(i,f_j,k)\cdot G(f_j,k)\cdot MI\cdot SM \qquad (5')$$

When the process at step S103 is completed for all the frequency channels used by the secondary systems, the power distribution unit 140 further counts an interference between channels to redistribute the transmission power among the secondary systems (step S104). For example, redistribution of the transmission power in the even method is carried out in accordance with Formula (12) below (Formula (12') in a case of the combination with the interference-causing margin reduction method).

$$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{\sum_{kk=1}^{M_j} \{L(i, f_j, kk) \cdot G(f_j, kk)\}} \quad (12)$$

$$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{\sum_{kk=1}^{M_j} \{L(i, f_j, kk) \cdot G(f_j, kk) \cdot SM\}} \quad (12')$$

Formula (12) means that an acceptable interference amount remained by subtracting an interference amount owing to usage of the adjacent channel from the acceptable interference amount of the primary system is redistributed among the rest of the secondary systems. Similarly, redistribution of the transmission power in the uneven method may be carried out in accordance with Formula (13) (Formula (13') in a case of the combination with the interference-causing margin reduction method).

$$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{L(i, f_j, k) \cdot G(f_j, k) \cdot M_j} \quad (13)$$

$$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{L(i, f_j, k) \cdot G(f_j, k) \cdot M_j \cdot SM} \quad (13')$$

Here, a weight in the weighted distribution method may be naturally further applied to the mathematical formulas for redistribution described above.

Next, the power distribution unit 140 searches the service area of the primary system for a point having the severest interference amount which is evaluated on the basis of the transmission power after redistribution (step S105). For example, a point i' having the severest interference amount is searched for as shown in Formula (14) or Formula (14') below.

$$i' = \underset{i}{\operatorname{argmin}} \left( I_{acceptable}(i, f_j) - \sum_{k=1}^{M_j} P'(f_j, k) \cdot L(i, f_j, k) \cdot G(f_j, k) - \sum_{jj=1}^{O_j} \sum_{kk=1}^{N_{jj}} \{P'(f_{jj}, kk) \cdot L(i, f_{jj}, kk) \cdot G(f_{jj}, kk) / H(f_j, f_{jj}, kk)\} \right) \quad (14)$$

$$i' = \underset{i}{\operatorname{argmin}} \left( \begin{array}{l} I_{acceptable}(i, f_j) - \sum_{k=1}^{M_j} P'(f_j, k) \cdot \\ L(i, f_j, k) \cdot G(f_j, k) \cdot SM - \\ \sum_{jj=1}^{O_j} \sum_{kk=1}^{N_{jj}} \{P'(f_{jj}, kk) \cdot L(i, f_{jj}, kk) \cdot \\ G(f_{jj}, kk) \cdot SM / H(f_j, f_{jj}, kk)\} \end{array} \right) \quad (14')$$

Next, the power distribution unit 140 calculates a correction coefficient Δ for the power distribution as shown in Formula below on the basis of a total interference amount at the point i' and acceptable interference amount $I_{acceptable}(i, f_j)$ (step S106).

$$\Delta = \frac{I_{acceptable}(i', f_j)}{\sum_{k=1}^{M_j} P'(f_j, k) \cdot L(i', f_j, k) \cdot G(f_j, k) + \sum_{jj=1}^{O_j} \sum_{kk=1}^{N_{jj}} \{P'(f_{jj}, kk) \cdot L(i', f_{jj}, kk) \cdot G(f_{jj}, kk) / H(f_j, f_{jj}, kk)\}} \quad (15)$$

$$\Delta = \frac{I_{acceptable}(i', f_j)}{\sum_{k=1}^{M_j} P'(f_j, k) \cdot L(i', f_j, k) \cdot G(f_j, k) \cdot SM + \sum_{jj=1}^{O_j} \sum_{kk=1}^{N_{jj}} \{P'(f_{jj}, kk) \cdot L(i', f_{jj}, kk) \cdot G(f_{jj}, kk) / H(f_j, f_{jj}, kk)\}} \quad (15')$$

Here, above Formula (15') may be used in a case where the interference-causing margin reduction method is applied upon the power distribution.

Then, the power distribution unit 140 uses the calculated correction coefficient Δ to modify the transmission power in accordance with a formula below and derive an acceptable transmission power P''($f_j$,k) of the secondary system k (step S107).

$$P''(f_j, k) = P'(f_j, k) \cdot \Delta \quad (16)$$

Note that in the case of not taking into account the influences among different frequency channels, the redistribution of the transmission power described above (step S104 in FIG. 6A) may be omitted. In that case, in Formula (13) to Formula (16), the transmission powers P($f_j$, k) and P($f_{jj}$, kk) may be used in place of the transmission powers P'($f_j$, k) and P'($f_{jj}$, kk), respectively.

(3-2) Second Example

Figure 6B:
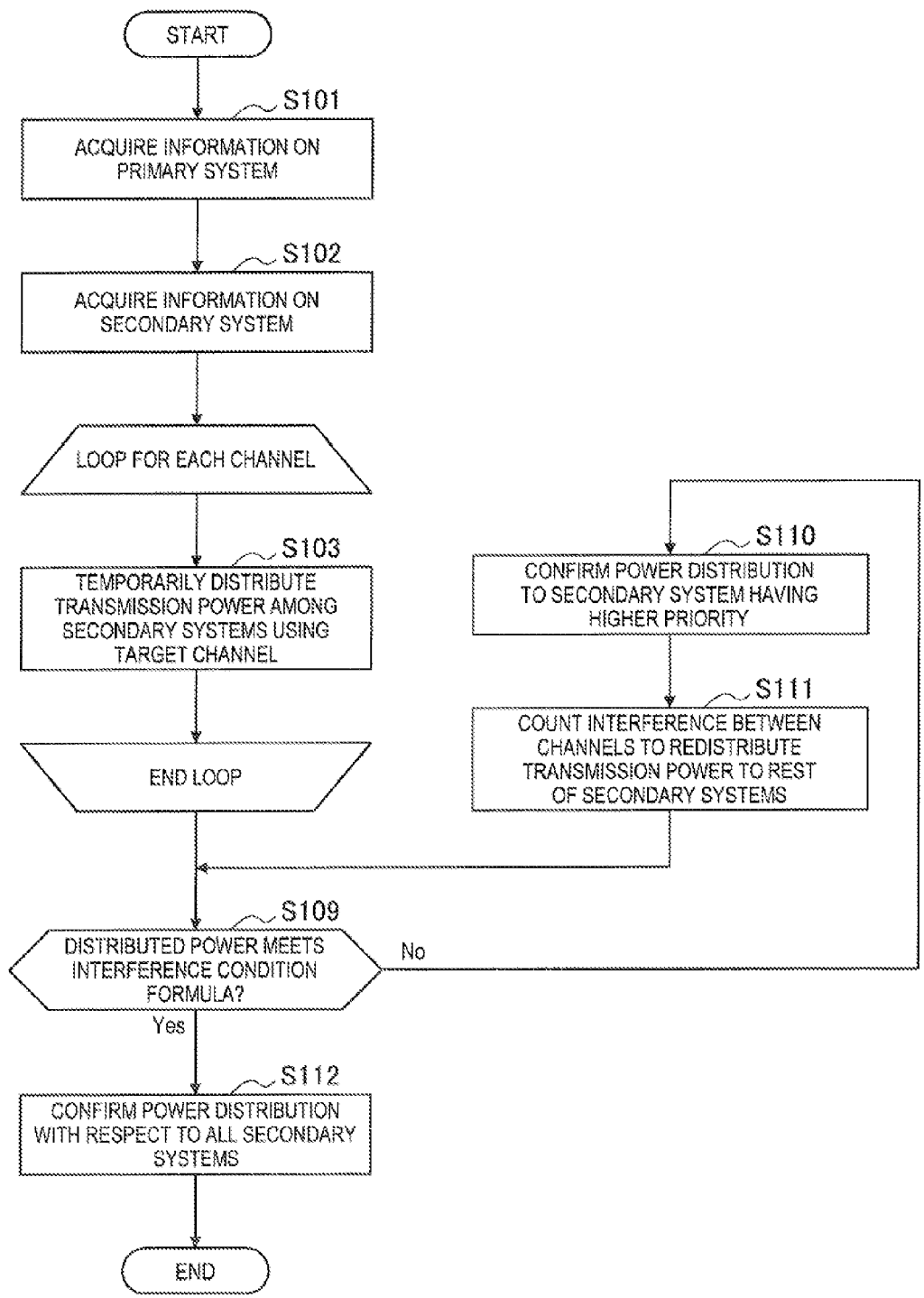
FIG. 6B is a flowchart illustrating a second example of flow of the power distribution processing according to one embodiment.

FIG. 6B is a flowchart illustrating a second example of flow of the power distribution processing by the power distribution unit 140. In the second example, similar to the first example, the power distribution unit 140 temporarily allocates for each frequency channel the transmission power to the secondary system which secondarily uses the relevant frequency channel, and thereafter, redistributes the temporarily allocated transmission power with taking into account the influences among different frequency channels. However, in the second example, the power distribution unit 140 confirms the temporarily allocated transmission power in a stepwise manner, for example, depending on the priority for each secondary system or for each frequency channel.

In the example of FIG. 6B, first, the power distribution unit 140 temporarily distributes the transmission power for each channel with respect to all the frequency channels used by the secondary systems similarly to the first example (step S101 to step S103). Next, the power distribution unit 140 determines whether or not the temporarily distributed transmission power meets Formula (2) in the interference control model describe above (step S109). Here, if Formula (2) is not met, the process proceeds to step S110.

At step S110, the power distribution unit 140 confirms the power distribution to the secondary system having higher priority among the secondary systems with the power distribution being unconfirmed (step S110). For example, the power distribution unit 140 may confirm the transmission power which is temporarily distributed to the secondary system having higher priority as the acceptable transmission power for the relevant secondary system without any change. Instead, the power distribution unit 140 may confirm, for example, a value obtained by multiplying the temporarily distributed transmission power by a weight depending on the priority as the acceptable transmission power for the relevant secondary system.

Next, the power distribution unit 140 counts the interference between channels to redistribute the transmission power to the rest of the secondary systems with the power distribution being unconfirmed (step S111). A calculating formula here may be the same as Formula (12) or Formula (13) described above.

After that, at step S109 in a case where Formula (2) is met, the power distribution unit 140 confirms the temporarily distributed transmission power or redistributed transmission power as the acceptable transmission power with respect to all the secondary systems (step S112).

(3-3) Third Example

In a third example of the power distribution processing, the power distribution unit 140, differently from the first example and second example, decides allocation of the transmission power without through a step temporarily distributing the transmission power for each frequency channel.

First, given that a difference between a left-hand side and a right-hand side in Formula (2) is $D_j$, and then Formula (2) can be represented as below.

$$I_{acceptable}(i, f_j) = \sum_{k=1}^{M_j} P(f_j, k) \cdot L(i, f_j, k) \cdot G(f_j, k) + \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\} + D_j \quad (17)$$

Here, assuming that the acceptable interference amount $I_{acceptable}(i, f_j)$ (j=1, ..., $O_j$) for each frequency channel is given. Moreover, given that the transmission power allocated to each of $M_j+N_{jj}$ secondary systems is $P_s$ (s=1, ..., $M_j+N_{jj}$). Then, by extending Formula (17), a relation expression below holds between an $O_j$-dimensional acceptable interference amount vector and an $M_j+N_{jj}$-dimensional transmission power vector.

$$\begin{bmatrix} I_{acceptable}(i, f_1) \\ I_{acceptable}(i, f_2) \\ \vdots \\ I_{acceptable}(i, f_{Oj}) \end{bmatrix} = \begin{bmatrix} a_{1,1} & \cdots & a_{Mj+Njj,1} \\ \vdots & \ddots & \vdots \\ a_{1,Oj} & \cdots & a_{Mj+Njj,Oj} \end{bmatrix} \begin{bmatrix} P_1 \\ P_2 \\ \vdots \\ P_{Mj+Njj} \end{bmatrix} + \begin{bmatrix} D_1 \\ D_2 \\ \vdots \\ D_{Oj} \end{bmatrix} \quad (18)$$

A coefficient $a_{s,j}$ appearing in Formula (18) which is multiplied by a transmission power $P_s$ of the s-th secondary system in terms of the j-th frequency channel may be calculated on the basis of the path loss L, gain component G, and loss component H in the interference control model described above. Therefore, the power distribution unit 140, after calculating a coefficient matrix in Formula (18), may derive a solution Formula (18) to calculate a transmission power vector ($P_1, \ldots, P_{Mj+Njj}$).

Given that the acceptable interference amount vector is $I_{acceptable}$, the transmission power vector is $P_v$, and the coefficient matrix is A. Then, Formula (18) is represented as below. Here, elements of a vector D corresponding to the margin may be fixed values or zero.

$$I_{acceptable} = A \cdot P_v + D \quad (19)$$

For example, if the number of the secondary systems, $M_j+N_{jj}$, is equal to the number of the frequency channels, $O_j$, the power distribution unit 140 can calculate the transmission power vector ($P_1, \ldots, P_{Mj+Njj}$) using an inverse matrix of the coefficient matrix A which is a square matrix . . . as below.

$$P_v = A^{-1}(I_{acceptable} - D) \quad (20)$$

Note that is the number of the secondary systems, $M_j+N_{jj}$, is not equal to the number of the frequency channels, $O_j$, the power distribution unit 140 may decide one transmission power vector selected from a plurality of solutions of the transmission power vector as a solution of the transmission power to be allocated to each secondary system. Additionally, the solution of Formula (18) may be an approximate solution. Further, in place of the number of the secondary systems, $M_j+N_{jj}$, the number obtained by accumulating the number of the secondary systems to be taken into account for each channel may be dealt with as a dimension number of the transmission power vector as shown in a formula below.

$$M_j + \sum_{jj=1}^{O_j} N_{jj} \quad (21)$$

Figure 6C:
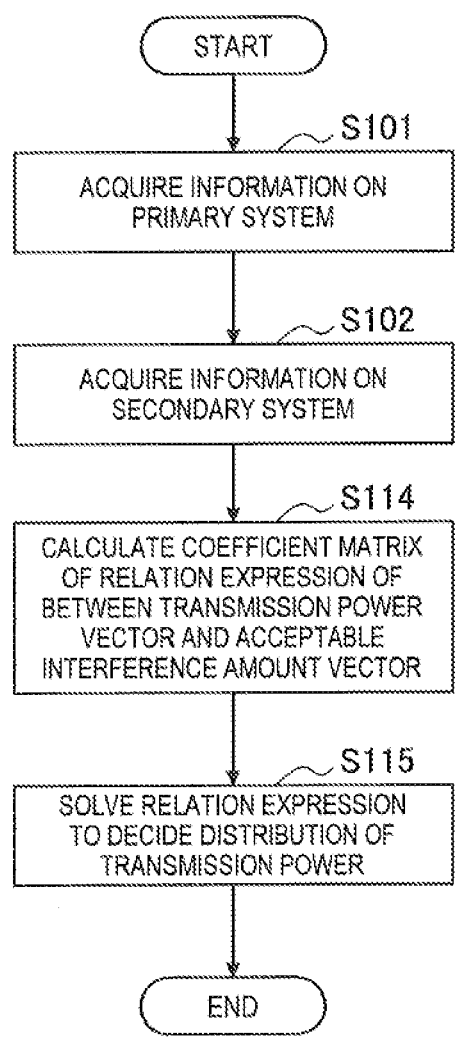
FIG. 6C is a flowchart illustrating a third example of flow of the power distribution processing according to one embodiment.

FIG. 6C is a flowchart illustrating the third example of flow of the power distribution processing by the power distribution unit 140.

With reference to FIG. 6C, first, the power distribution unit 140 acquires from the storage unit 120 the information on the primary system provided from data server 30 (step S101). The information acquired here includes the acceptable interference amount vector $I_{acceptable}$ in Formula (18). In addition, the power distribution unit 140 acquires from the storage unit 120 the information on the secondary system collected from the master node 200 (step S102).

Next, the power distribution unit 140 calculates, in accordance with the interference control model described above, the coefficient matrix A of a relation expression between a transmission power vector $P_{tx}$ and the acceptable interference amount vector $I_{acceptable}$ (step S114). This allows a relation expression to be made such as Formula (18) between the transmission power vector $P_{tx}$ and the acceptable interference amount vector $I_{acceptable}$. Then, the power distribution unit 140 solves the made relation expression to decide distribution of the transmission power and set each element of the transmission power vector as the acceptable transmission power for each secondary system (step S115).

Note that three power distribution processing described here are merely examples. That is, the power distribution unit 140 may distribute the transmission power to the secondary system using other methods. Moreover, FIG. 4 shows the example that the transmission power is adjusted in response to a new secondary system appearance (that is, increase in the number of the secondary systems). However, more generally, the acceptable transmission power may be updated in response to various events including change in the number of the secondary systems or move of the secondary system, or periodically to determine a predetermined notification condition by the notification unit 150 described below.

(4) Notification Unit

The notification unit 150 decides a value of the allocable transmission power depending on a value of the acceptable transmission power distributed by the power distribution unit 140. Then, if a predetermined notification condition is satisfied, the notification unit 150 notifies each secondary system of the decided value of the allocable transmission power. The value of the allocable transmission power may be typically decided by removing a predetermined margin from the value of the acceptable transmission power. For example, given that the value of the acceptable transmission power distributed to the secondary system k in terms of the channel $f_j$ is $P_{tmp}(f_j, k)$, and then, a value $P_{tx}(f_j, k)$ of the allocable transmission power may be decided using a margin Z as shown in a formula below.

$$P_{tx}(f_j,k)=P_{tmp}(f_j,k)-Z \quad (22)$$

A value of the margin Z may be stored as a fixed value by the communication control device 100 in advance, or may be dynamically decided depending on a value $P_{tmp}$ of the acceptable transmission power or other parameters, for example. Moreover, a different value of the margin Z may be used for each channel.

The notification condition for the notification unit 150 to newly notify the secondary system of the value of the allocable transmission power may be represented using a value of the allocable transmission power which is previously notified and a value of the acceptable transmission power which is newly distributed with respect to the relevant secondary system. Given that, with respect to a certain secondary system, a value of the allocable transmission power which is previously notified is $P_{tx,prev}$, a value of the acceptable transmission power which is newly distributed is $P_{tmp,new}$, and a value of a new allocable transmission power which is decided from $P_{tmp,new}$ in accordance with Formula (22) is $P_{tx,new}$. Then, the notification condition may be represented as shown in a formula below.

$$P_{tx,prev} > P_{tmp,new} \quad (23)$$

or $$P_{tx,prev}+Th_{tx} < P_{tx,new}=P_{tmp,new}-Z \quad (24)$$

Formula (23) means that the value $P_{tx,prev}$ of the allocable transmission power which is previously notified is larger than the value $P_{tmp,new}$ of the acceptable transmission power which is newly distributed. If such an inequality is satisfied, the secondary system is using the transmission power larger than the acceptable transmission power calculated in response to the most recent status. Therefore, the notification unit 150 notifies the secondary system of the value $P_{tx,new}$ of the new allocable transmission power in order to decrease the transmission power used by the secondary system.

Formula (24) means that a difference obtained by subtracting the value $P_{tx,prev}$ of the allocable transmission power which is previously notified from the new value $P_{tx,new}$ of the allocable transmission power decided depending on the value $P_{tmp,new}$ of the acceptable transmission power which is newly distributed is larger than a predetermined threshold $Th_{tx}$. If such an inequality is satisfied, no excessive interference occurs to the primary system even if the transmission power the secondary system is currently using is increased up to the allocable transmission power calculated in response to the most recent status. Therefore, the notification unit 150 notifies the secondary system of the value of the new allocable transmission power $P_{tx,new}$ in order to increase the transmission power for the secondary system to extend a communication chance. The threshold $Th_{tx}$ may be stored as a fixed value by the communication control device 100 in advance, or may be dynamically decided depending on the value $P_{tx,prev}$ of the allocable transmission power or other parameters, for example.

Here, the notification unit 150 may, with respect to the newly appearing secondary system, notify of the value of the new allocable transmission power $P_{tx,new}$ without determination of the above notification condition.

As shown in Formula (22), in this embodiment, the margin Z is counted in the value or the allocable transmission power notified to the secondary system. In other words, the value of the allocable transmission power is a value obtained by subtracting a predetermined margin from the value of the acceptable transmission power. Therefore, even in a case where the acceptable transmission power may decrease in response to changing statuses such as increase and decrease in the number of the secondary system or move of the secondary system, a respite is left until the acceptable transmission power falls below the transmission power the secondary system is using. Then, so long as the acceptable transmission power does not fall below the transmission power the secondary system is using, the allocable transmission power for the relevant secondary system is no updated. Moreover, even if the acceptable transmission power may increase, the allocable transmission power for the secondary system is not updated until an increasing width thereof exceeds a certain level (level corresponding to the above threshold $Th_{tx}$). Therefore, the excessive interference to the primary system is avoided as well as increase in the signaling for notifying the allocable transmission power is suppressed.

Typically, the value of the allocable transmission power may be discretely updated in terms of integral multiple of a predetermined unit of update (e.g., 1 dBm or 5 dBm). The notification unit 150 may notify each secondary system of the new value of the allocable transmission power by, for example, signaling a difference value of the allocable transmission power to each secondary system. A difference value $dP_{tx}$ of the allocable transmission power may be calculated by a formula below.

$$dP_{tx}=P_{tx,new}-P_{tx,prev} \quad (25)$$

The notification unit 150 may signal the difference value quantized by use of the above predetermined unit of update in order to further reduce the overhead of signaling. Given that the unit of update is $p_{unit}$, and then $dP_{tx}$ may be quantizes as shown in a formula below.

$$dP_{tx,quantized} = \frac{dP_{tx}}{P_{unit}} \quad (26)$$

Therefore, the power notification message transmitted from the notification unit 150 to each secondary system may include a master node 200 address of each secondary system as well as a difference value $dP_{tx,quantized}$ of the quantized allocable transmission power above. This allows a bit length of the message to be reduced compared with a case where the new value of the allocable transmission power $P_{tx,new}$ itself is included in the power notification message.

The notification unit 150, in addition to the determination of the above notification condition, determines whether or not the accumulative interference amount to the primary system violates the acceptable interference amount, and may not notify the secondary system of the new value of the allocable transmission power if the accumulative interference amount does not violate the acceptable interference amount.

The accumulative interference amount to the primary system may be estimated as a sum $I_{est}(i, f_j)$ of the interference amounts to the primary system on the basis of the values of the allocable transmission powers across one or more secondary systems as shown in a formula below. Note that, used as the transmission power value $P_{tx}$, are the new value $P_{tx,new}$ of the allocable transmission power for the new secondary system and the value $P_{tx,prev}$ of the allocable transmission power which is previously notified for the existing secondary system in a formula below.

$$I_{est}(i, f_j) = \sum_{k=1}^{M_j} P_{tx}(f_j, k) \cdot L(i, f_j, k) \cdot G(f_j, k) + \quad (27)$$

$$\sum_{jj=1}^{O_j} \sum_{kk=1}^{N_{jj}} \{P_{tx}(f_{jj}, kk) \cdot L(i, f_{jj}, kk) \cdot G(f_{jj}, kk) / H(f_j, f_{jj}, kk)\}$$

wherein $$P_{tx}(f_j, k) = \begin{cases} P_{tx,new}(f_j, k) & \text{(new system)} \\ P_{tx,prev}(f_j, k) & \text{(existing system)} \end{cases}$$

Notification of the new value of the allocable transmission power to the secondary system is carried out only in a case where the sum $I_{est}(i, f_j)$ of the interference amounts to the primary system satisfies a formula below.

$$I_{est}(i, f_j) > I_{acceptable}(i, f_j) \quad (28)$$

Here, the $I_{acceptable}(i, f_j)$ in Formula (28) represents the acceptable interference amount for the channel $f_j$ at the reference point i. Additional determination like this makes it possible to further efficiently suppress increase in signaling for notifying the allocable transmission power.

FIG. 7 is an explanatory diagram illustrating an exemplary configuration of a secondary system management table 122 the storage unit 120 has in this embodiment. With reference to FIG. 7, the secondary system management table 122 has five items of "channel number," "system ID" "acceptable transmission power" "margin amount" "allocable transmission power" and "update date." The "channel number" is a number to identify each of the secondarily usable frequency channels. The "system ID" is an identifier to uniquely identify the secondary system. A device ID of the master node 200 of the secondary system may be used as the system ID. The "acceptable transmission power" represents a value of the acceptable transmission power corresponding to the allocable transmission power notified to each secondary system. The "margin amount" represents a value of the margin Z which is removed from the value of the acceptable transmission power upon deciding the allocable transmission power notified to each secondary system. The "allocable transmission power" represents a value of the allocable transmission power notified to each secondary system. The "update date" represents a date when each record in the secondary system management table 122 is updated.

In a case where the notification condition as described above is satisfied, the notification unit 150 notifies each secondary system of the value of the allocable transmission power to update the "acceptable transmission power," "margin amount," allocable transmission power", and "update date" in the secondary system management table 122. Then, these items of data in the secondary system management table 122 are referred to upon next determination of the notification condition by the notification unit 150.

[3-2. Flow of Process]

Next, an explanation will be given of a flow of process by the communication control device 100 according to this embodiment using FIG. 8 to FIG. 11.

(1) Power Adjustment Processing

Figure 8:
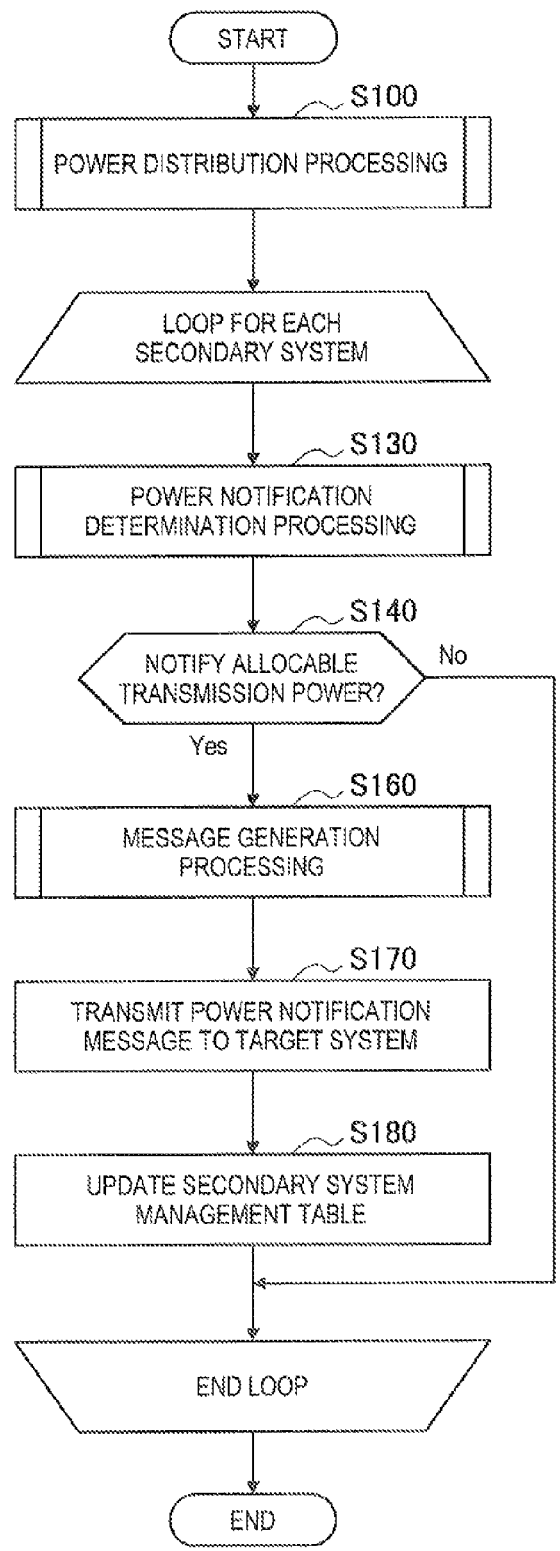
FIG. 8 is a flowchart illustrating an example of flow of a power adjustment processing by the communication control device according to one embodiment.

FIG. 8 is a flowchart illustrating an example of flow of the power adjustment processing by the communication control device 100. With reference to FIG. 8, first, the power distribution processing is performed by the power distribution unit 140 according to any of the methods shown in FIG. 6A to FIG. 6C (step S100). The processes at steps S130 to S180 thereafter are repeated with respect to each secondary system.

At step S130, the notification unit 130 focuses on one secondary system (hereinafter, referred to as a target system) to perform the power notification determination processing (step S130). An explanation will be further given later of an example of detailed flow of the power notification determination processing of this step. If it is determined in the power notification determination processing that the target system is not notified of the allocable transmission power, the subsequent processes are skipped (step S140).

If it is determined in power notification determination processing that the target system is notified of the allocable transmission power, the notification unit 130 performs the message generation processing to generate the power notification message directed to the target system (step S160). Then, the notification unit 130 transmits the generated power notification message from the communication unit 110 to the target system (step S170). Further, the notification unit 130 updates the data for the acceptable transmission power of the target system, margin amount, and allocable transmission power stored in the secondary system management table 122 (step S180).

When these processes are completed for all the secondary systems (or all the active secondary systems), the power adjustment processing shown in FIG. 8 ends.

(2) Power Notification Determination Processing

Figure 9A:
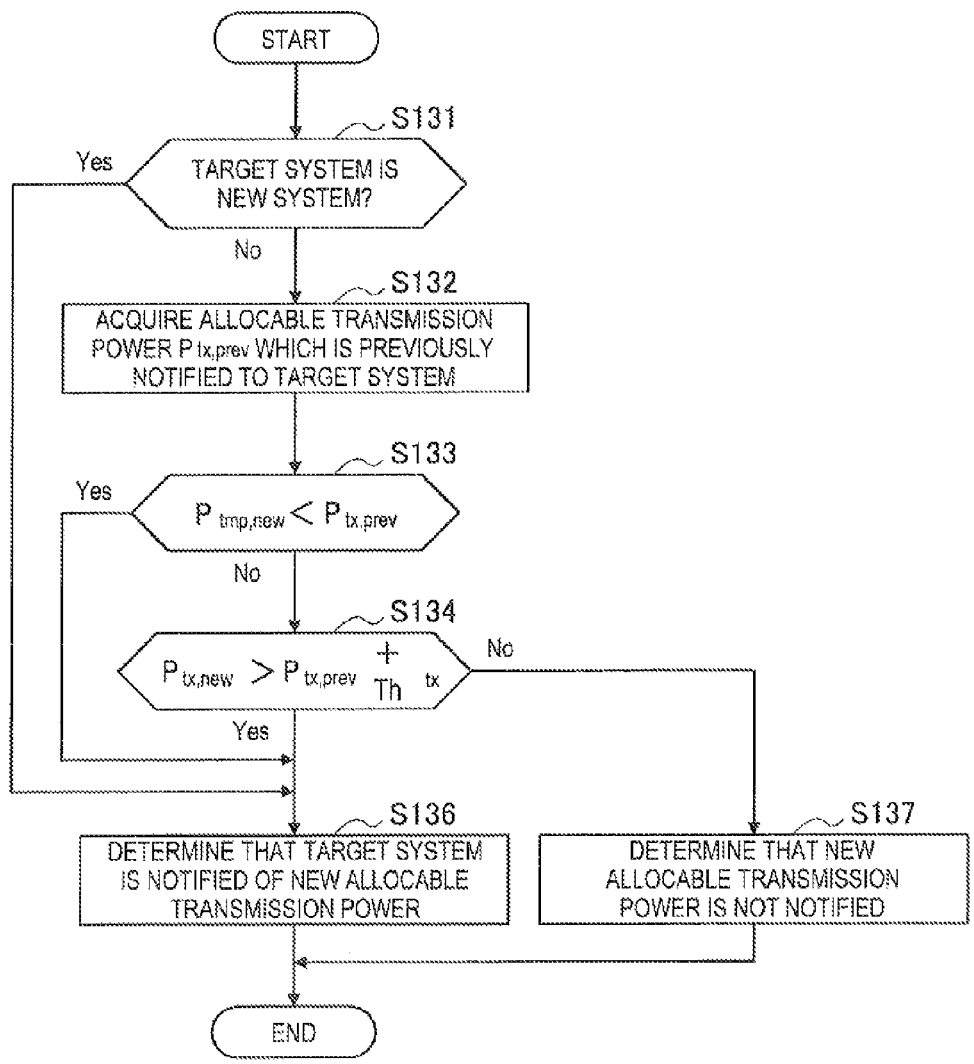
FIG. 9A is a flowchart illustrating a first example of detailed flow of a power notification determination processing illustrated in FIG. 8.

FIG. 9A is a flowchart illustrating a first example of detailed flow of the power notification determination processing corresponding to step S130 in FIG. 8.

With reference to FIG. 9A, first, the notification unit 150 determines whether or not the target system is the newly appearing secondary system (step S131). Here, if the target system is the newly appearing secondary system, the notification unit 150 determines that the target system is notified of a new allocable transmission power (step S136). On the other hand, if the target system is the existing secondary system, the process proceeds to step S132.

At step S132, the notification unit 150 acquires the value $P_{tx,prev}$ of the allocable transmission power which is previously notified to the target system from the secondary system management table 122 (step S132). Then, the notification unit 150 uses the value $P_{tmp,new}$ of the acceptable transmission power which is newly distributed to the target system by the power distribution unit 140 and the value $P_{tx,prev}$ of the allocable transmission power which is previously notified to determines whether or not the notification condition described above is satisfied. For example, in a case of $P_{tmp,new} < P_{tx,prev}$, the notification condition described above is satisfied and therefore the process proceeds to step S136 (step S133). In addition, also in a case of $P_{tx,prev} + Th_{tx} < P_{tx,prev} = P_{tmp,new} - Z$, the notification condition described above is satisfied, and therefore the process proceeds to step S136 (step S134). If the notification condition described above is not satisfied, the process proceeds to step S137.

When the process proceeds to step S136, the notification unit 135 determines that the target system is notified of the value of the new allocable transmission power (step S136). On the other hand, when the process proceeds to step S137, the notification unit 135 determines that the target system is not notified of the value of the new allocable transmission power (step S137).

FIG. 9B is a flowchart illustrating a second example of detailed flow of the power notification determination processing corresponding to step S130 in FIG. 8. Here, assuming that the communication control device 100 knows a maximum transmission power value $P_{tx,max}$ capable of being output in each secondary system.

With reference to FIG. 9B, first, the notification unit 150 determines whether or not the target system is the newly appearing secondary system (step S131). Here, if the target system is the newly appearing secondary system, the notification unit 150 determines that the target system is notified of the new allocable transmission power (step S136). On the other hand, if the target system is the existing secondary system, the process proceeds to step S132.

At step S132, the notification unit 150 acquires the value $P_{tx,prev}$ of the allocable transmission power which is previously notified to the target system from the secondary system management table 122 (step S132). Then, the notification unit 150 uses the value $P_{tmp,new}$ of the acceptable transmission power which is newly distributed to the target system by the power distribution unit 140 and the value $P_{tx,prev}$ of the allocable transmission power which is previously notified to determine whether or not the notification condition described above is satisfied. For example, in a case of $P_{tmp,new} < P_{tx,prev}$, the notification condition described above is satisfied, and therefore the process proceeds to step S136 (step S133). In addition, also in a case or $P_{tx,prev} + Th_{tx} < P_{tx,new}$, the notification condition described above is satisfied However, in the second example, the notification unit 150 further compares the $P_{tx,new}$ with the maximum transmission power value $P_{tx,max}$ of the target system. Then, only in a case where $P_{tx,new}$ is equal to or less than $P_{tx,max}$, the process proceeds to step S136 (step S134). On the other hand, if the notification condition described above is not satisfied or $P_{tx,new}$ exceeds $P_{tx,max}$, the process proceeds to step S137.

When the process proceeds to step S136, the notification unit 135 determines that the target system is notified of the value of the new allocable transmission power (step S136). On the other hand, when the process proceeds to step S137, the notification unit 135 determines that the target system is not notified of the value of the new allocable transmission power (step S137).

In the second example, allocation of an excessive transmission power is not carried out which exceeds a range capable of being output in the target system, and signaling for notifying the allocable transmission power can be further reduced. The communication control device 100 may hold also a minimum value of a requested transmission power for each secondary system and exclude the target system of which the allocable transmission power falls below the minimum value of the requested transmission power from the power allocation targets.

Note that an event as a trigger of the power adjustment processing illustrated in FIG. 8 typically includes three kinds of events Ev1 to Ev3 below.

Ev1) Increase in the number of the secondary systems
Ev2) Decrease in the number of the secondary systems
Ev3) Move of the secondary system Among them, in a case of the event Ev1, since the allocable transmission power for the existing secondary system does not increase typically, the determination at step S134 in FIG. 9A or step S134 and S135 in FIG. 9B may be omitted. Similarly, in a case of the event Ev2, since the acceptable transmission power for the existing secondary system does not decrease typically, the determination at step S133 in FIG. 9A or FIG. 9B may be omitted. The event Ev2 may be recognized by an explicit notification of detachment from the secondary system or recognized by not receiving a signal from the secondary system (e.g., beacon) which is monitored with a cycle able to be registered in advance. If the periodical signal from the secondary system is not received, the event Ev2 may be determined to occur after a further predetermined waiting time lapses. This makes it possible to prevent unnecessary signaling from occurring which is due to the increase or decrease of the secondary system in a case where the master node of the secondary system temporarily turns off or sleeps.

(3) Message Generation Processing

Figure 10:
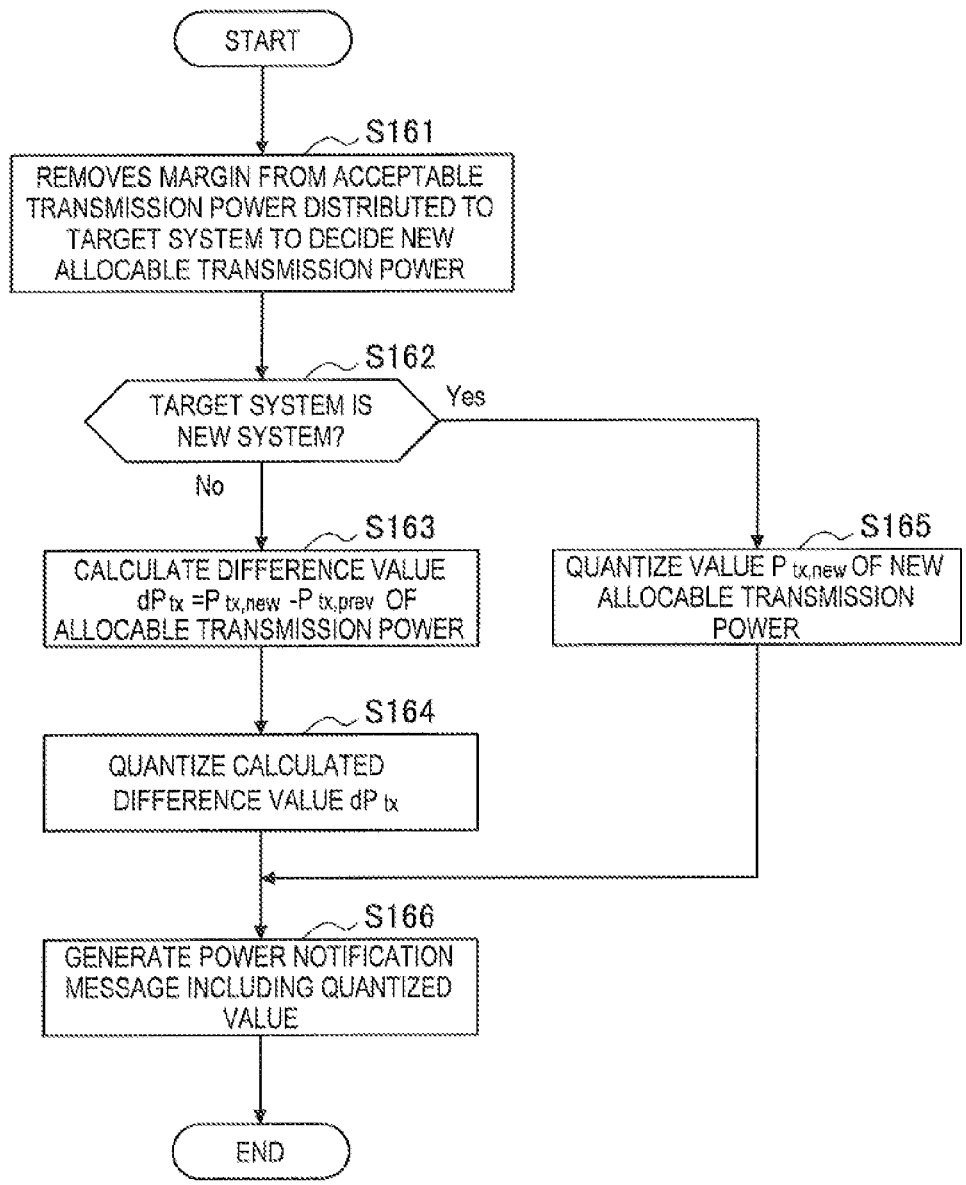
FIG. 10 is a flowchart illustrating an example of detailed flow of a message generation processing illustrated in FIG. 8.

FIG. 10 is a flowchart illustrating an example of detailed flow of the message generation processing corresponding to step S160 in FIG. 8.

With reference to FIG. 10, first, the notification unit 150 removes the margin Z from the value $P_{tmp,new}$ of the acceptable transmission power which is newly distributed to the target system by the power distribution unit 140 to decide the value of the new allocable transmission power $P_{tx,new}$ (step S161).

Next, the notification unit 150 determines whether or not the target system is the newly appearing secondary system (step S162). Here, if the target system is the newly appearing secondary system, the process proceeds to step S165. On the other hand, if the target system is the existing secondary system, the process proceeds to step S163.

At step S163, the notification unit 150 calculates a difference value $dP_{tx} = P_{tx,new} - P_{tx,prev}$ of the allocable transmission power (step S163). Further, the notification unit 150 quantizes the calculated difference value $dP_{tx}$ by use of the unit of update $p_{unit}$ (step S164). On the other hand, at step S165 the notification unit 150 quantizes the value $P_{tx,new}$ of the new allocable transmission power by use of the unit of update $p_{unit}$ (step S165).

Then, the notification unit 150 generates the power notification message which, for example, includes a field indicating the quantized allocable transmission power value (difference value in the existing secondary system) and is directed to the address of the master node 200 of the target system (step S166).

The power notification message generated in this way is transmitted from the communication control device 100 to the master node 200 of the target system at step S170 in FIG. 8.

(4) Additional Determination Processing

FIG. 11 is a flowchart illustrating an example of flow of a determination processing for determining the accumulative interference amount using Formula (27) and Formula (28) described above. Such a determination processing may be performed in addition to the power notification determination processing at step S130 in FIG. 8.

With reference to FIG. 11, first, the notification unit 150 acquires the value $P_{tx,new}$ of the allocable transmission power which is newly distributed for the new secondary system (step S151). Additionally, the notification unit 150 acquires the value $P_{tx,prev}$ of the allocable transmission power which is previously notified to the existing secondary system (step S152). Next, the notification unit 150 estimates the sum $I_{est}$ of the interference amounts to the primary system in accordance with Formula (27) (step S153). Then, the notification unit 150 determines whether or not the estimated sum $I_{est}$ of the interference amounts violates the acceptable interference amount $I_{acceptable}$ of the primary system (step S154). Here, if the estimated sum $I_{est}$ of the interference amounts violates the acceptable interference amount $I_{acceptable}$, the notification unit 150 determines that each of the existing systems is notified of the value of the new allocable transmission power (step S155). On the other hand, if the estimated sum $I_{est}$ of the interference amounts does not violate the acceptable interference amount $I_{acceptable}$, the notification unit 150 determines that the existing system is not notified of the value of the new allocable transmission power (step S156).

[3-3. Distance Between Primary System and Secondary System]

In the power distribution processing described above, a distance between the primary system and the secondary system is required to be decided in order to derive the path loss for each secondary system. The distance between the primary system and the secondary system may be defined in accordance with, for example, any of examples described below.

(1) First Example

In a first example, the distance between the primary system and the secondary system is the shortest distance from a position of each secondary system to a periphery of the service area for the primary system.

Figure 12A:
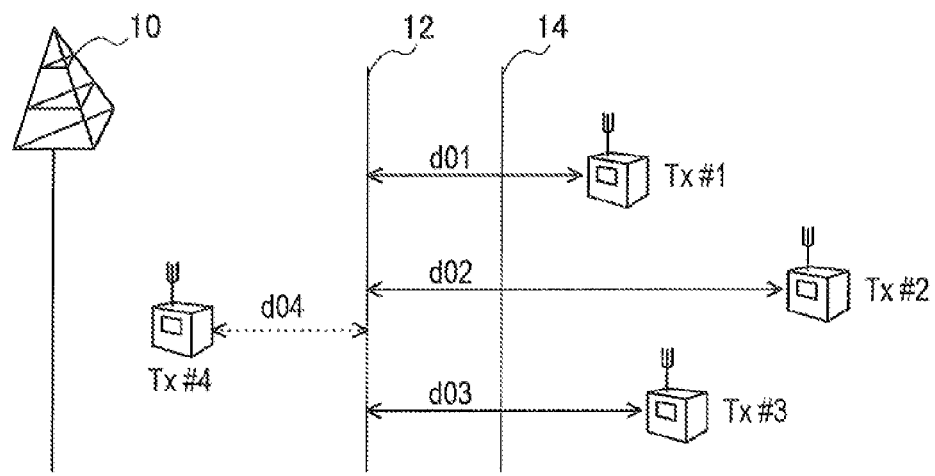
FIG. 12A is an explanatory diagram for explaining a first example of a definition for a distance between the primary system and each secondary system.

For example, FIG. 12A shows the boundary 12 corresponding to the periphery of the service area for the primary system and four secondary systems. A first, second and third secondary systems are located outside the service area for the primary system. The shortest distances from the first, second and third secondary systems to the periphery of the service area for the primary system are d01, d02, and d03, respectively. On the other hand, a fourth secondary system is located inside the service area for the primary system. When deriving the path loss concerning the fourth secondary system, the distance between the primary system and the secondary system may be considered to be zero. In that case, the path loss becomes the largest. Instead, the shortest distance from the fourth secondary system to the boundary 12 is dealt with as a distance between the primary system and the fourth secondary system.

(2) Second Example

In a second example, the distance between the primary system and the secondary system is a distance from a position of each secondary system to a certain point on or inside the periphery of the service area for the primary system. The certain point may be, for example, a point on the periphery of the service area for the primary system which is the closest to a secondary system. In addition, the certain point may be, for example, a point having the smallest sum of distances from a plurality of secondary systems. This point is thought to be a position located by a virtual reception station of the primary system suffering the interference from the secondary system.

For example, FIG. 12B shows again the boundary 12 and four secondary systems. The first, second, and third secondary systems are located outside the service area for the primary system. Here, given that a point on boundary 12 the closest to the first secondary system is P1. The distances between the first, second, and third secondary systems and the primary system correspond to distances d11, d12, and d13 between each position of the first, second, and third secondary systems and the point P1, respectively. On the other hand, the fourth secondary system is located inside the service area for the primary system. When acquiring the path loss concerning the fourth secondary system, similarly to the first example, the distance between the primary system and the secondary system may be considered to be zero. Instead, a distance between the fourth secondary system and the point P1 may be dealt with as the distance between the primary system and the fourth secondary system.

Figure 12B:
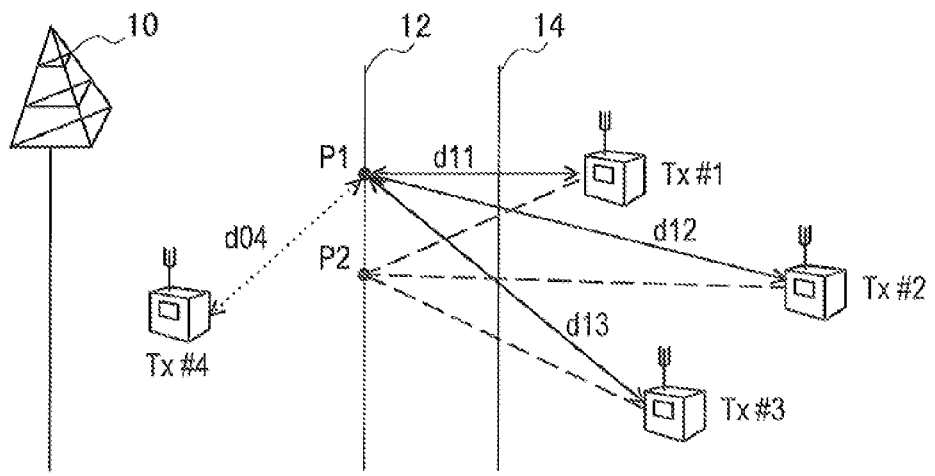
FIG. 12B is an explanatory diagram for explaining a second example of the definition for the distance between the primary system and each secondary system.

In FIG. 12B, a point P2 is a point on the boundary 12 having the smallest sum of the distances from the first, second, and third secondary systems. The point P2 like this may be used in place of the point P1. Note that, for example, in a case where many of the secondary systems are located far from the guard area for the primary system, where it is known that the primary reception station exists only in a narrow geographical area, where the acceptable interference amount is considerably severe at a certain point or the like, a certain point specified in advance may be used as a reference point for distance calculation. Additionally, in a case where plural different acceptable interference amounts are regulated for each modulation system, the reference point may be selected taking into account not only the distance but also the modulation system or the plural acceptable interference amounts.

In comparison of the first example and the second example, in the case of the first example, the distance calculation is easy while a value of the path loss is possibly estimated to be excessively small. For example, such a situation may occur in a case where two secondary systems are located with the primary system present therebetween. In that case, the transmission power allocated to the secondary system has a smaller value. Therefore, it can be said that the first example is low in calculation cost and more secure definition in view of interference prevention. On the other hand, in the second example, the value of the path loss is less prone to be estimated to be excessively small, and chances of the secondary usage can be more increased.

(3) Third Example

Figure 12C:
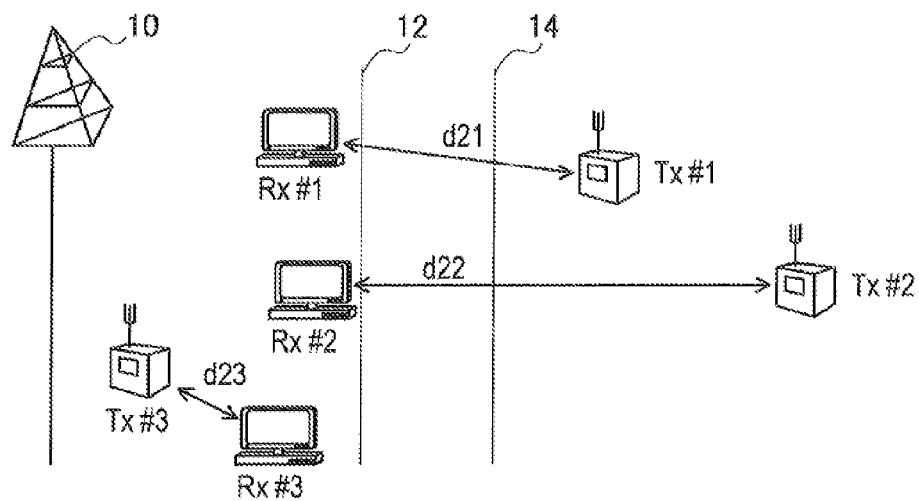
FIG. 12C is an explanatory diagram for explaining a third example of the definition for the distance between the primary system and each secondary system.

In the third example, the distance between the primary system and the secondary system is a distance from a position of each secondary system to the most adjacent primary reception station. For example, FIG. 12C shows three secondary systems and three primary reception stations. A first primary reception station is located the most adjacent to the first secondary system. A distance between the first secondary system and the first primary reception station is d21. A second primary reception station is located the most adjacent to the second secondary system. A distance between the secondary system and the second primary reception station is d22. A third primary reception station is located the most adjacent to the third secondary system. A distance between the third secondary system and the third primary reception station is d23. Therefore, d21 may be used as the distance between the first secondary system and the primary system, d22 may be is used as the distance between the second secondary system the primary system, and d23 may be used as the distance between the third secondary system and the primary system.

(4) Fourth Example

Figure 12D:
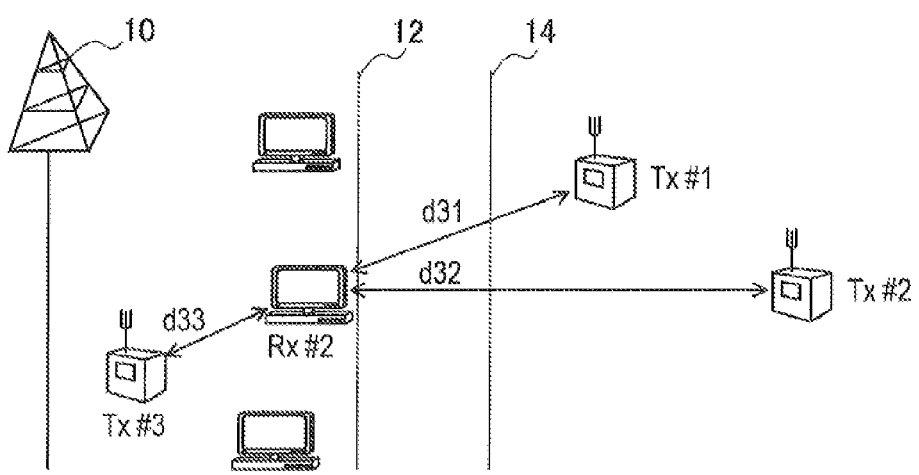
FIG. 12D is an explanatory diagram for explaining a fourth example of the definition for the distance between the primary system and each secondary system.

In a fourth example, the distance between the primary system and each secondary system is a distance to the primary reception station having the smallest sum of distances from the positions of all secondary systems. For example, FIG. 12D shows again three secondary systems and three primary reception stations. Among them, the primary reception station having the smallest sum of distances from the positions of three secondary systems is the second primary reception station. A distance between the first secondary system and the second primary reception station is d31. A distance between the secondary system and the second primary reception station is d32. A distance between the third secondary system and the second primary reception station is d33. Therefore, d31 may be used as the distance between first secondary system and the primary system, d32 may be used as the distance between the second secondary system and the primary system, and d33 may be used as the distance between the third secondary system and the primary system.

In the third and fourth examples, the actual position of the primary reception station is used as the reference point for distance calculation, and thus, which allows more practical interference amount estimation.

In the examples in FIG. 12A to FIG. 12D, the explanation is mainly given of how the reference point on the primary system side is to be set in calculating the distance between the primary system and the secondary system. However, various setting methods are possible concerning also the reference point on the secondary system side. For example, the position of the reference point on the secondary system side may be simply the position of the master node 200 as a master of the secondary system. Instead, the position of the reference point on the secondary system side may be, of the nodes of the secondary system (master node and slave node), a position of the node closest to guard area for the primary system or any of the primary reception stations. In addition, although the calculation is complicated, a plurality of distances may be calculated based on the positions of the plural nodes of the secondary system to calculate a comprehensive path loss in accordance with the relevant plurality of distances. These setting methods of the reference point on the secondary system side may be respectively combined with any of the setting methods of the reference point on the primary system side illustrated in FIG. 12A to FIG. 12D.

Further, for example, the reference point on the secondary system side may be set in a stepwise manner as below. First, the reference point on the secondary system side is temporarily set to the master node 200 as a master of the secondary system. Next, one point on the periphery of the service area for the primary system the closest to the master node 200 or a position of the primary reception station the closest thereto is set to the reference point on the primary system side. Subsequently, the interference given to the above reference point on the primary system side is estimated for each of the nodes of the secondary system (master node and slave node). Then, the position of the node on the secondary system side to give the maximum interference to the above reference point on the primary system side is set to the final reference point on the secondary system side. In estimating the interference for each node of the secondary system, different transmission powers may be considered depending on kinds of nodes (master node or slave node).

[3-4. Simplification of Term of Interference Between Channels]

In the first example described above of the power distribution processing by the power distribution unit 140, the term evaluating the interference between channels may be replaced with a fixed or variable margin amount. Given that a margin amount in the channel $f_j$ is $R_{int,j}$, Formula (13) to Formula (15) described above may be converted into Formula (29) to Formula (31) shown as below.

$$P'(f_j, k) = \frac{I_{acceptable}(i, f_j)}{L(i, f_j, k) \cdot G(f_j, k) \cdot R_{Int,j}} \quad (29)$$

$$i' = \operatorname*{argmin}_i \left( \frac{I_{acceptable}(i, f_j)}{R_{Int,j}} - \sum_{k=1}^{M_j} P'(f_j, k) \cdot L(i, f_j, k) \cdot G(f_j, k) \right) \quad (30)$$

$$\Delta = \frac{I_{acceptable}(i', f_j)}{\left\{ \sum_{k=1}^{M_j} P'(f_j, k) \cdot L(i', f_j, k) \cdot G(f_j, k) \right\} \cdot R_{Int,j}} \quad (31)$$

Formula (29) to Formula (31) above mean that the interference between channels from each secondary system to the primary system is evaluated using a simplified method which does not depend on the path loss of each secondary system. A margin amount $R_{int,j}$ may be typically set depending on the number of the secondary systems using the adjacent channel to the channel $f_j$. For example, in the next example of Formula (32), the margin amount $R_{int,j}$ is equal to the sum of the numbers of the secondary systems using the adjacent channel. In an example of Formula (33), weighting is applied depending on the loss component H from the adjacent channel. In an example of Formula (34), the loss component H is replaced with a weight coefficient $\gamma_{jj}$ (for example, the larger an interval between the channel becomes, the smaller value the weight coefficient $\gamma_{jj}$ may be set to).

$$R_{Int,j} = \sum_{jj=1}^{O_j} N_{jj} \quad (32)$$

$$R_{Int,j} = \sum_{jj=1}^{O_j} \frac{N_{jj}}{H(f_j, f_{jj}, kk)} \quad (33)$$

$$R_{Int,j} = \sum_{jj=1}^{O_j} \gamma_{jj} \cdot N_{jj} \quad (34)$$

As a result of replacing the term of the interference between channels like this, the move of the secondary system which secondarily uses a channel causes low variability of the acceptable transmission power distributed to the secondary system which secondarily uses the adjacent channel to the relevant channel. This allows the notification condition described above to be less frequently satisfied to suppress the increase in signaling.

Further, in Formula (32) to Formula (34), with respect to the number $N_{jj}$ of secondary systems concerning each adjacent channel, the actual number is replaced with a nominal number $N'_{jj}$. The nominal number $N'_{jj}$ of secondary systems concerning each adjacent channel is not updated until an update condition below is satisfied, for example.

$$N_{jj} < n_{low} \cdot N'_{jj} \text{ 又は } n_{high} \cdot N'_{jj} < N_{jj} \tag{35}$$

or

If it is determined that the actual number $N_{jj}$ of secondary systems and the nominal number $N'_{jj}$ of secondary systems concerning each adjacent channel satisfy the above update condition, the nominal number $N'_{jj}$ of secondary systems may be updated in accordance with any of formulas shown below. Here, parameters $dN_1$, $dN_2$, $dN_3$ in each formula are additional parameters which may be defined in advance.

$$N'_{jj} \leftarrow N'_{jj} + (N_{jj} - N'_{jj}) + dN_1 \tag{36}$$

$$N'_{jj} \leftarrow N'_{jj} + dN_2 \cdot (N_{jj} - N'_{jj}) \tag{37}$$

$$N'_{jj} \leftarrow N'_{jj} + c \cdot dN_3 \tag{38}$$

The update of the nominal number $N'_{jj}$ of secondary systems concerning each adjacent channel may be carried out, for example, by the power distribution unit 140 after step S102 in the flowchart of FIG. 6A. Introduction of the nominal number N'jj of secondary systems like this causes that the margin amount $R_{int,j}$ for evaluating the interference between channels does not completely follow the actual number of the secondary systems and varies after waiting for the update of the nominal number $N'_{jj}$ of secondary systems. Therefore, increase and decrease in the number of the secondary systems which secondarily use a channel causes low variability of the acceptable transmission power distributed to the secondary system which secondarily uses the adjacent channel to the relevant channel. As a result, the notification condition described above can be further less frequently satisfied.

<4.>Exemplary Configuration of Master Node>

FIG. 13 is a block diagram illustrating an exemplary configuration of the master node 200 which is a communication device operating the secondary system by use of the transmission power allocated to the communication control device 100 described above. With reference to FIG. 13, the master node 200 includes a communication unit 210, control unit 220, storage unit 230, and wireless communication unit 240.

The communication unit 210 operates as a communication interface for communication between the data server 30 and the communication control device 100 by the master node 200. The communication unit 210, under a control by the control unit 220, transmits information on the secondary system to the data server 30, for example, at the start of the secondary usage. Additionally, the communication unit 210 receives information notified from the data server 30. Moreover, the communication unit 210 transmits and receives a request for interference control and acknowledge to and from the communication control device 100. Further, the communication unit 210 receives the power notification message from the communication control device 100 to output the received message to the control unit 220.

The control unit 220 has a function to control general operation of the master node 200. For example, the control unit 220 cooperates with the communication control device 100 in the sequence illustrated in FIG. 4 to suppress the interference to the primary system in operating the secondary system. More specifically, the control unit 220 refers to the value of the allocable transmission power indicated by the power notification message received from the communication control device 100. Then, the control unit 220 sets the transmission power falling within a range of the allocable transmission power to the wireless communication unit 240 for operating the secondary system. The control unit 220 may further distribute the allocable transmission power among the nodes participating in secondary system, for example.

The storage unit 230 uses a storage medium such as a hard disk or semiconductor memory to store a program and data used for cooperation with the communication control device 100 and operation of the secondary system.

The wireless communication unit 240 operates as a wireless communication interface for wireless communication between the master node 200 and the slave nodes connected with the relevant master node 200. The wireless communication unit 240 transmits and receives a wireless signal to and from one or more slave nodes in accordance with IEEE802.22, IEEE802.11af, or ECMA-392, for example. The transmission power of the wireless signal transmitted by the wireless communication unit 240 may be controlled within the above described range of the allocable transmission power by the control unit 220.

<5. Explanatory Modification>

In this description, the explanation has been given of mainly the examples in which various calculation processes for adjusting the transmission power for the secondary system are performed by the communication control device 100 having a function as the secondary system manager. As explained regarding FIG. 3, the communication control device 100 may be mounted on the physically same device as the data server 30 or any of the master nodes 200. Moreover, a part of the calculation processes described above may be performed on the physically different device.

For example, besides a first device carrying out relatively complex calculation on the basis of the interference control model described above, a second device carrying out simple parameter calculation may be provided. In this case, the second device may carry out acquisition of the distribution margin MI, acquisition of the safety margin SM, calculation of the allocable transmission power from the acceptable transmission power, or calculation of the difference value of the allocable transmission power and quantization thereof, for example. The second device, instead of using the fixed distribution margin MI, may calculate the distribution margin MI, for example, in accordance with any of calculating formulas below depending on the number of the secondary systems.

$$MI_{[dB]} = 10 \cdot \log_{10}(N_{potential\_max\_interferers}) \tag{39}$$

$$MI_{[dB]} = 10 \cdot \log_{10}(\max(N_{active\_interferers}(f_{WSD}))) \tag{40}$$

In Formula (39), $N_{potential\_max\_interferers}$ represents the potential maximum number of the secondary systems which may become interference sources at the same time. If $N_{potential\_max\_interferers}$ is 2, MI is about 3.0 [dB]; if it is 3, MI is about 4.8 [dB]; and if it is 4, MI is about 6.0 [dB]. On the other hand, in Formula (40), $N_{active\_interferers}(f_{WSD})$ represents the number of the active secondary systems which secondarily use a channel $f_{WSD}$ at the same time. Note that an offset value dMI may be added to the calculating formula of MI as below.

$$MI_{[dB]} = 10 \cdot \log_{10}(N_{potential\_max\_interferers}) + dMI \tag{41}$$

$$MI_{[dB]} = 10 \cdot \log_{10}(\max(N_{active\_interferers}(f_{WSD}))) + dMI \tag{42}$$

<6. Conclusion>

Heretofore, an embodiment of the technology according to the present disclosure has been explained in detail using FIG. 1 to FIG. 13. According to the embodiments described above, in allocating the transmission power to the secondary systems which secondarily use the frequency channel protected for the primary system, the secondary system is notified of the allocable transmission power decided depending on the acceptable transmission power which is distributed between the secondary systems. Such a notification is carried out only in the case where, upon updating the transmission power, the value of the allocable transmission power which is previously notified and the value of the acceptable transmission power which is newly distributed satisfy a predetermined notification condition. Therefore, if the number of the secondary systems changes or the secondary system moves, signaling for notifying the transmission power does not necessarily occur across a plurality of secondary systems. Accordingly, the signaling can be suppressed from increasing.

The above notification condition may include a condition that the value of the allocable transmission power which is previously notified is larger than the value of the acceptable transmission power which is newly distributed. According to such a configuration, in the case where the interference amount to the primary system possibly exceeds the acceptable interference amount, the value of the new allocable transmission power is notified to the secondary system. Therefore, the accumulated interferences from a plurality of secondary systems are prevented from giving the negative influence to the primary system.

In addition, the above notification condition may include a condition that a difference obtained by subtracting the value of the allocable transmission power which is previously notified from the value of the allocable transmission power which is newly decided is larger than a predetermined threshold. According to such a configuration, in the case where the acceptable transmission power increases, the allocable transmission power for the secondary system is maintained until the increasing width thereof exceeds a predetermined threshold. Therefore, the signaling increase prevention may be balanced with communication chance increase due to rise of the allocable transmission power.

Moreover, the secondary system manager recommends the channel for secondary usage to the secondary system such that, in adjustment of the transmission power which is brought about in the future, possibility for considerably varying the value of the acceptable transmission power is reduced and the signaling can be prevented from increasing.

Note that a series of control processes by the respective devices explained in this description may be achieved by any of software, hardware, and combination of software and hardware. Programs constituting the software are stored in a storage medium provided inside or outside each device in advance, for example. Then, each program is, for example, read into a RAM (Random Access Memory) when executed to be executed by a processor such as a CPU (Central Processing Unit).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

Additionally, the present technology may also be configured as below.

(1)

A communication control device including:

a power distribution unit configured to distribute, to one or more secondary systems, a transmission power accepted for a secondary usage of a frequency channel which is protected for a primary system; and a notification unit configured to notify each secondary system of a value of a second transmission power which is decided depending on a value of a first transmission power distributed by the power distribution unit, wherein, upon updating the transmission power, only in a case where a value of the second transmission power which is previously notified and a value of the first transmission power which is newly distributed by the power distribution unit satisfy a predetermined condition with respect to a certain secondary system, the notification unit notifies the secondary system of a new value of the second transmission power.

(2)

The communication control device according to (1), wherein the predetermined condition includes a condition that the value of the second transmission power which is previously notified is larger than the value of the first transmission power which is newly distributed by the power distribution unit.

(3)

The communication control device according to (1) or (2), wherein the predetermined condition includes a condition that a difference is larger than a predetermined threshold, the difference being obtained by subtracting the value of the second transmission power which is previously notified from the new value of the second transmission power decided depending on the value of the first transmission power which is newly distributed.

(4)

The communication control device according to any one of (1) to (3), wherein the value of the second transmission power is decided by removing a predetermined margin from the value of the first transmission power.

(5)

The communication control device according to any one of (1) to (4), wherein in a case where the new value of the second transmission power which distributed to an existing secondary system is larger than the maximum value of the transmission power capable of being output in the secondary system, the notification unit does not notify the secondary system of the new value of the second transmission power.

(6)

The communication control device according to any one of (1) to (5), wherein the power distribution unit carries out distribution calculation of the first transmission power in response to events including change in the number of the secondary systems or move of the secondary system, or periodically.

(7)

The communication control device according to any one of (1) to (6), wherein, upon updating the transmission power, the notification unit further compares a sum of interference amounts to the primary system on a basis of a value of an allocable transmission power across the one or more secondary systems with an acceptable interference amount of the primary system, and notifies the existing secondary system of the new value of the second transmission power only in a case where the sum of the interference amounts violates the acceptable interference amount.

(8)

The communication control device according to any one of (1) to (7), wherein the notification unit notifies each secondary system of the new value of the second transmission power by signaling a difference value from the previous notification of the second transmission power.

(9)

The communication control device according to (8), wherein the value of the second transmission power is discretely updated in terms of integral multiple of a predetermined unit of update, and wherein the notification unit signals the difference value quantized by use of the predetermined unit of update.

(10)

The communication control device according to any one of (1) to (9), wherein the power distribution unit distributes the transmission power to the one or more secondary systems by evaluating an interference between channels from each secondary system to the primary system using a simplified method which does not depend on a path loss of each secondary system.

(11)

The communication control device according to (10), wherein the power distribution unit evaluates the interference between channels from each secondary system to the primary system using the number of nominal secondary systems which does not completely follow the number of actual secondary systems for each channel.

(12)

A communication control method including:

distributing, to one or more secondary systems, a transmission power accepted for a secondary usage of a frequency channel which is protected for a primary system; and notifying each secondary system of a value of a second transmission power which is decided depending on a value of a first transmission power distributed by the power distribution unit, wherein, upon updating the transmission power, only in a case where a value of the second transmission power which is previously notified and a value of the first transmission power which is newly distributed satisfy a predetermined condition with respect to a certain secondary system, the secondary system is notified of a new value of the second transmission power.

(13)

A communication control system including:
a communication control device including
a power distribution unit configured to distribute, to one or more secondary systems, a transmission power accepted for a secondary usage of a frequency channel which is protected for a primary system, and
a notification unit configured to notify each secondary system of a value of a second transmission power which is decided depending on a value of a first transmission power distributed by the power distribution unit; and
a communication device configured to set a transmission power for operating the secondary system within a range of the value of the second transmission power notified from the communication control device, wherein, upon updating the transmission power, only in a case where a value of the second transmission power which is previously notified to the communication device and a value of the first transmission power which is newly distributed to the communication device satisfy a predetermined condition, the notification unit of the communication control device notifies the communication device of the new value of the second transmission power.

REFERENCE SIGNS LIST

1 Communication Control System
10 Primary transmission station
20 Primary reception station
100 Communication control device
140 Power distribution unit
150 Notification unit
200 Master node of secondary system

The invention claimed is:

1. A communication control device comprising:
a power distribution unit to distribute, to one or more secondary systems, a transmission power accepted for a secondary usage of a frequency channel which is protected for a primary system, and
a notification unit to notify each secondary system of a value of a second transmission power which is decided depending on a value of a first transmission power distributed by the power distribution unit,
wherein, upon updating the transmission power, only in a case where a value of the second transmission power which is previously notified and a value of the first transmission power which is newly distributed by the device satisfy a predetermined condition with respect to a certain secondary system, the device notifies the secondary system of a new value of the second transmission power, and
wherein, the device updates the transmission power by using a nominal number of secondary systems using one or more frequency channels adjacent to the frequency channel which is protected for the primary system, the nominal number being used in place of an actual number of secondary systems using the one or more frequency channels adjacent to the frequency channel which is protected for the primary system, and the nominal number being different from the actual number.

2. The communication control device according to claim 1, wherein the predetermined condition includes a condition that the value of the second transmission power which is previously notified is larger than the value of the first transmission power which is newly distributed by the device.

3. The communication control device according to claim 1, wherein the predetermined condition includes a condition that a difference is larger than a predetermined threshold, the difference being obtained by subtracting the value of the second transmission power which is previously notified from the new value of the second transmission power decided depending on the value of the first transmission power which is newly distributed.

4. The communication control device according to claim 1, wherein the value of the second transmission power is decided by removing a predetermined margin from the value of the first transmission power.

5. The communication control device according to claim 1, wherein in a case where the new value of the second transmission power which distributed to an existing secondary system is larger than the maximum value of the transmission power capable of being output in the secondary system, the device does not notify the secondary system of the new value of the second transmission power.

6. The communication control device according to claim 1, wherein the device carries out distribution calculation of the first transmission power in response to events including change in the number of the secondary systems or move of the secondary system, or periodically.

7. The communication control device according to claim 1, wherein, upon updating the transmission power, the device further compares a sum of interference amounts to the primary system on a basis of a value of an allocable transmission power across the one or more secondary systems with an acceptable interference amount of the primary system, and notifies the existing secondary system of the new value of the second transmission power only in a case where the sum of the interference amounts violates the acceptable interference amount.

8. The communication control device according to claim 1, wherein the device notifies each secondary system of the new value of the second transmission power by signaling a difference value from the previous notification of the second transmission power.

9. The communication control device according to claim 8,
wherein the value of the second transmission power is discretely updated in terms of integral multiple of a predetermined unit of update, and
wherein the device signals the difference value quantized by use of the predetermined unit of update.

10. The communication control device according to claim 1, wherein the device distributes the transmission power to the one or more secondary systems by evaluating an interference between channels from each secondary system to the primary system using a simplified method which does not depend on a path loss of each secondary system.

11. The communication control device according to claim 10, wherein the device evaluates the interference between channels from each secondary system to the primary system using the number of nominal secondary systems which does not completely follow the number of actual secondary systems for each channel.

12. A communication control method comprising:
distributing, to one or more secondary systems by use of circuitry, a transmission power accepted for a secondary usage of a frequency channel which is protected for a primary system; and
notifying each secondary system of a value of a second transmission power which is decided depending on a value of a first transmission power distributed by the circuitry,
wherein, upon updating the transmission power, only in a case where a value of the second transmission power which is previously notified and a value of the first transmission power which is newly distributed satisfy a predetermined condition with respect to a certain secondary system, the secondary system is notified of a new value of the second transmission power,
wherein, the transmission power is updated by using a nominal number of secondary systems using one or more frequency channels adjacent to the frequency channel which is protected for the primary system, the nominal number being used in place of an actual number of secondary systems using the one or more frequency channels adjacent to the frequency channel which is protected for the primary system, and the nominal number being different from the actual number.

13. The communication control method according to claim 12, further comprising updating, by use of the circuitry, the nominal number of secondary systems when the nominal number of secondary systems and the actual number of the one or more secondary systems satisfy a predetermined condition.

14. A communication control system comprising:
a communication control device including a circuitry configured to distribute, to one or more secondary systems, a transmission power accepted for a secondary usage of a frequency channel which is protected for a primary system, and a circuitry configured to notify each secondary system of a value of a second transmission power which is decided depending on a value of a first transmission power distributed by the circuitry; and
a communication device configured to set a transmission power for operating the secondary system within a range of the value of the second transmission power notified from the communication control device,
wherein, upon updating the transmission power, only in a case where a value of the second transmission power which is previously notified to the communication device and a value of the first transmission power which is newly distributed to the communication device satisfy a predetermined condition, the circuitry of the communication control device notifies the communication device of the new value of the second transmission power
wherein, the circuitry updates the transmission power by using a nominal number of secondary systems using one or more frequency channels adjacent to the frequency channel which is protected for the primary system, the nominal number being used in place of an actual number of secondary systems using the one or more frequency channels adjacent to the frequency channel which is protected for the primary system, and the nominal number being different from the actual number.

15. The communication control device according to claim 1, wherein the device is configured to update the nominal number of secondary systems when the nominal number of secondary systems and the actual number of the one or more secondary systems satisfy a predetermined condition.

* * * * *